（12） United States Patent
Shi et al.

(10) Patent No.: US 9,710,023 B2
(45) Date of Patent: Jul. 18, 2017

(54) TREATMENT OF SUBSTRATE SUB-SURFACE

(71) Applicant: Apple Inc., Cupertino, CA (US)

(72) Inventors: Ming Kun Shi, San Jose, CA (US);
Jason O. Mettler, San Jose, CA (US);
Hilbert T. Kwan, San Jose, CA (US);
Christopher Bruni, San Jose, CA (US);
Qi Tian, Zhangye (CN); Jing Zhang, Shenyang (CN); Howard E. Bujtor, San Carlos, CA (US); Stephen V. Jayanathan, Oakland, CA (US);
Houtan R. Farahani, San Ramon, CA (US)

(73) Assignee: APPLE INC., Cupertino, CA (US)

(*) Notice: Subject to any disclaimer, the term of this patent is extended or adjusted under 35 U.S.C. 154(b) by 7 days.

(21) Appl. No.: 14/834,315

(22) Filed: Aug. 24, 2015

(65) Prior Publication Data

US 2016/0202732 A1  Jul. 14, 2016

Related U.S. Application Data

(60) Provisional application No. 62/101,826, filed on Jan. 9, 2015.

(51) Int. Cl.
*G06F 1/16* (2006.01)
(52) U.S. Cl.
CPC .......... *G06F 1/1656* (2013.01); *G06F 1/1688* (2013.01)

(58) Field of Classification Search
CPC .......................... G06F 1/1656; G06F 1/1688
See application file for complete search history.

(56) References Cited

U.S. PATENT DOCUMENTS

| 5,830,529 | A | * | 11/1998 | Ross | B41M 3/12 |
| | | | | | 101/211 |
| 7,697,711 | B2 | | 4/2010 | Whitehouse et al. | |
| 7,880,131 | B2 | * | 2/2011 | Andre | G09F 9/30 |
| | | | | | 250/227.26 |
| 7,961,455 | B2 | * | 6/2011 | Wippler | H05K 5/0017 |
| | | | | | 359/599 |
| 8,673,397 | B2 | * | 3/2014 | Bunker | C23C 4/02 |
| | | | | | 416/241 R |
| 8,994,662 | B2 | * | 3/2015 | Nakamura | G06F 3/02 |
| | | | | | 345/168 |
| 2004/0192225 | A1 | | 9/2004 | Mahn | |
| 2006/0067651 | A1 | * | 3/2006 | Chui | G02B 26/001 |
| | | | | | 385/147 |
| 2008/0084404 | A1 | * | 4/2008 | Andre | G09F 9/30 |
| | | | | | 345/204 |

(Continued)

Primary Examiner — Anthony Q Edwards
(74) Attorney, Agent, or Firm — Brownstein Hyatt Farber Schreck, LLP

(57) ABSTRACT

Perforated structures and methods for forming perforated structures are disclosed. The perforated structures include partial holes or blind-holes that pass partially through the substrate. The partial holes can be positioned proximate to through-holes that pass entirely through the substrate. The partial holes add mechanical strength to the perforated substrate. Described are methods for modifying the optical appearance of the partial holes such that the partial holes appear indistinguishable from the through-holes, which allows for flexibility in designing cosmetically appealing patterns within the perforated structures.

20 Claims, 25 Drawing Sheets

(56) References Cited

U.S. PATENT DOCUMENTS

| | | | | |
|---|---|---|---|---|
| 2008/0248300 | A1* | 10/2008 | Bogue | B05D 3/0254 |
| | | | | 428/357 |
| 2009/0003002 | A1* | 1/2009 | Sato | G02B 6/0043 |
| | | | | 362/341 |
| 2010/0008030 | A1* | 1/2010 | Weber | C25D 11/16 |
| | | | | 361/679.02 |
| 2010/0272306 | A1* | 10/2010 | Hoogenstraaten | H04R 1/028 |
| | | | | 381/386 |
| 2010/0327774 | A1* | 12/2010 | Kerr | G06F 1/165 |
| | | | | 315/307 |
| 2013/0147715 | A1* | 6/2013 | Nakamura | G06F 3/02 |
| | | | | 345/168 |
| 2014/0361934 | A1 | 12/2014 | Ely et al. | |
| 2015/0192964 | A1* | 7/2015 | Andre | G09F 9/30 |
| | | | | 361/679.09 |
| 2015/0303503 | A1* | 10/2015 | Winand | G06F 1/1635 |
| | | | | 361/679.02 |
| 2016/0143168 | A1* | 5/2016 | Garelli | G06F 1/1656 |
| | | | | 362/253 |

* cited by examiner

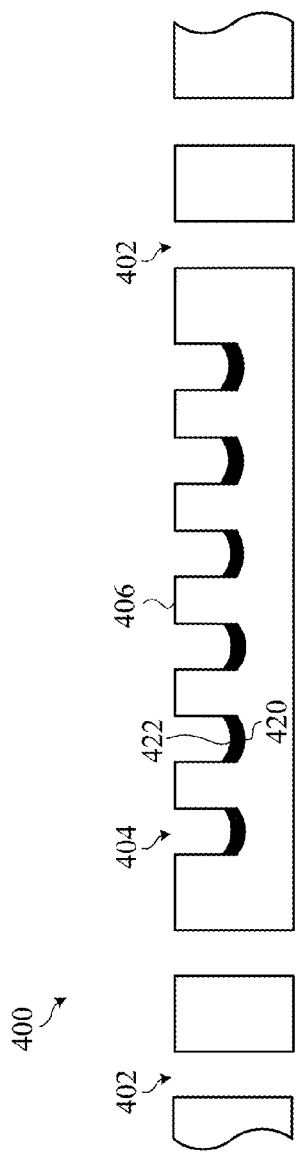
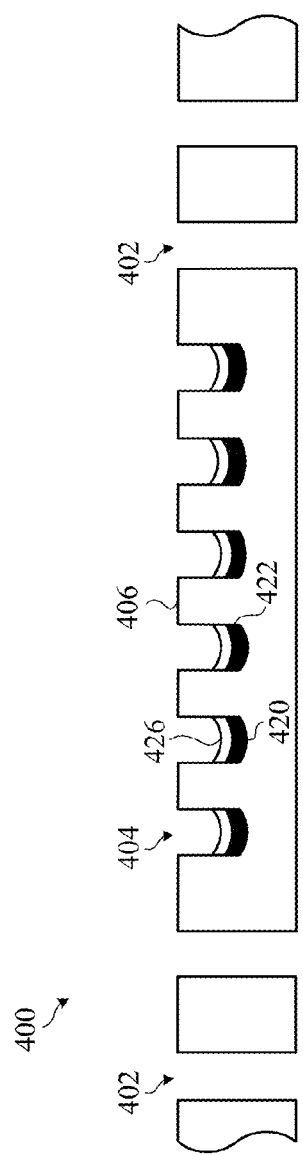

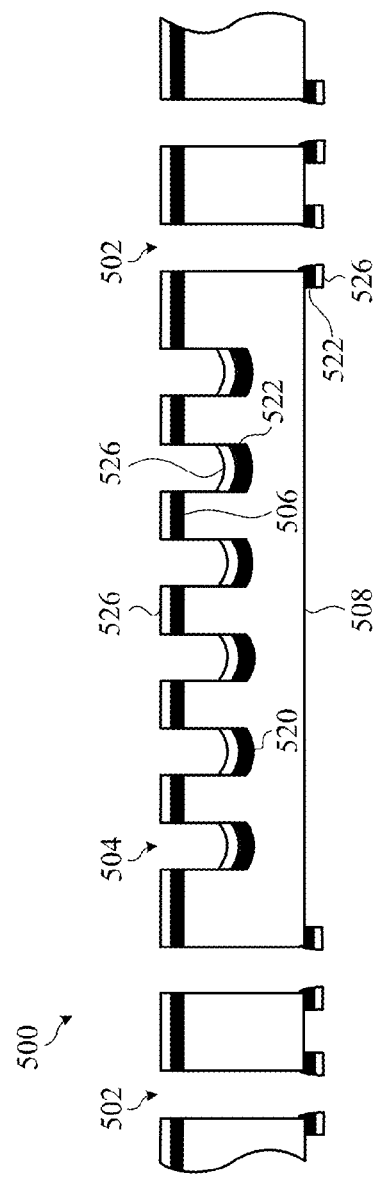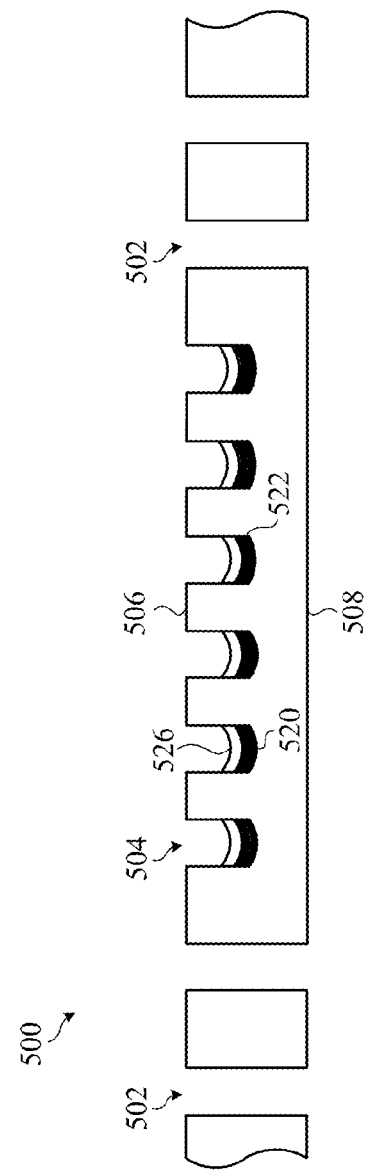

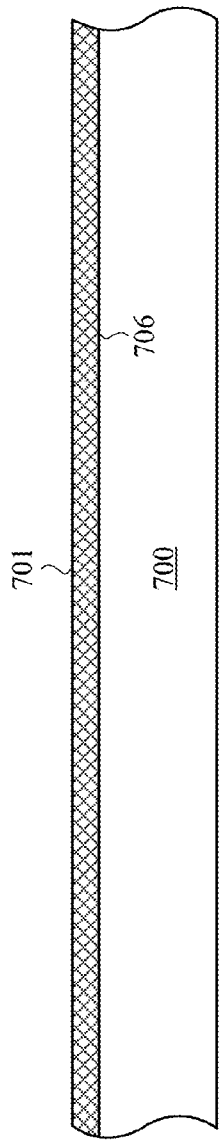
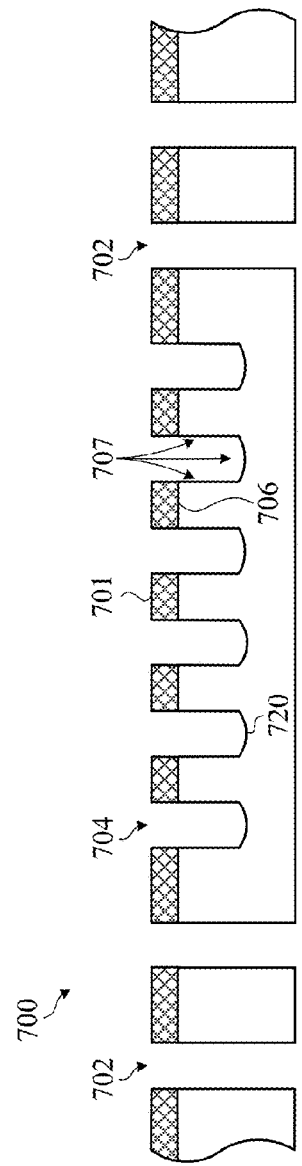
FIG. 7A
FIG. 7B

TREATMENT OF SUBSTRATE SUB-SURFACE

CROSS-REFERENCE TO RELATED APPLICATIONS

The present application claims the benefit of U.S. Provisional Application No. 62/101,826, entitled "TREATMENT OF SUBSTRATE SUB-SURFACE" filed Jan. 9, 2015, the content of which is incorporated herein by reference in its entirety for all purposes.

FIELD

This disclosure relates generally to systems and methods for treating perforated structures, such as speaker grids for electronic devices. In particular, systems and methods for improving the cosmetics and enhancing physical characteristics of perforated structures are described.

BACKGROUND

Many consumer electronic devices have sound systems that include acoustic speakers. The speakers are often contained within a housing of the electronic device, with through-holes provided through a portion of the housing that let acoustic sound from the speakers to pass through the housing and reach a user of the electronic device.

In some cases, these speaker holes are visible features of the housing. In order to make the speaker holes cosmetically appealing, the speaker holes can be arranged in appealing patterns. In some cases, this includes drilling more holes through the housing than required for adequate sound quality in order to provide a desired cosmetically appealing pattern. However, drilling more holes means removing more material from the housing, which can compromise the mechanical strength and structural integrity of the housing.

SUMMARY

This paper describes various embodiments that relate to perforated structures and methods for manufacturing the same. The perforated structures can make up portions of consumer products, such as housing for electronic devices. The methods described can be utilized in a manufacturing setting where a number of perforated structures as part of a product line are produced.

According to one embodiment, a housing for an electronic device is described. The housing includes a wall defining an internal cavity and having a perforated region at an exterior surface of the wall. The perforated region includes a through-hole having a through-hole opening at the exterior surface, the through-hole connecting the through-hole opening to the internal cavity. The perforated region also includes a blind-hole having a blind-hole opening at the exterior surface, the blind-hole formed partially through the wall and terminating at a terminal surface opposite the blind-hole opening. The terminal surface has a coating that absorbs light passing through the blind-hole opening and incident upon the coating.

According to another embodiment, a method of forming a perforated structure is described. The method includes forming through-holes within a substrate having a first surface and an opposing second surface. The through-holes are formed through the first surface and the second surface. The method also includes forming blind-holes within the substrate. The blind-holes are formed through the first surface and not through the second surface such that the blind-holes have terminal surfaces. The method further includes camouflaging the blind-holes to appear as through-holes by darkening the terminal surfaces of the blind-holes.

According to a further embodiment, a perforated structure is described. The perforated structure includes a substrate having a first surface and opposing second surface. The substrate includes a number of through-holes formed through the first surface and the second surface. The substrate also includes a number of partial holes formed through the first surface and not through the second surface such that inner walls define the partial holes. The inner walls have an ink coating that imparts a dark appearance to the partial holes.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

FIGS. 4A-4D show section views of a perforated substrate undergoing a selective ink depositing process.

FIGS. 5A-5D show section views of a perforated substrate undergoing a flood printing process.

FIGS. 7A-7D show section views of a perforated substrate undergoing a masking and flood printing process.

DETAILED DESCRIPTION

Figure 1A:
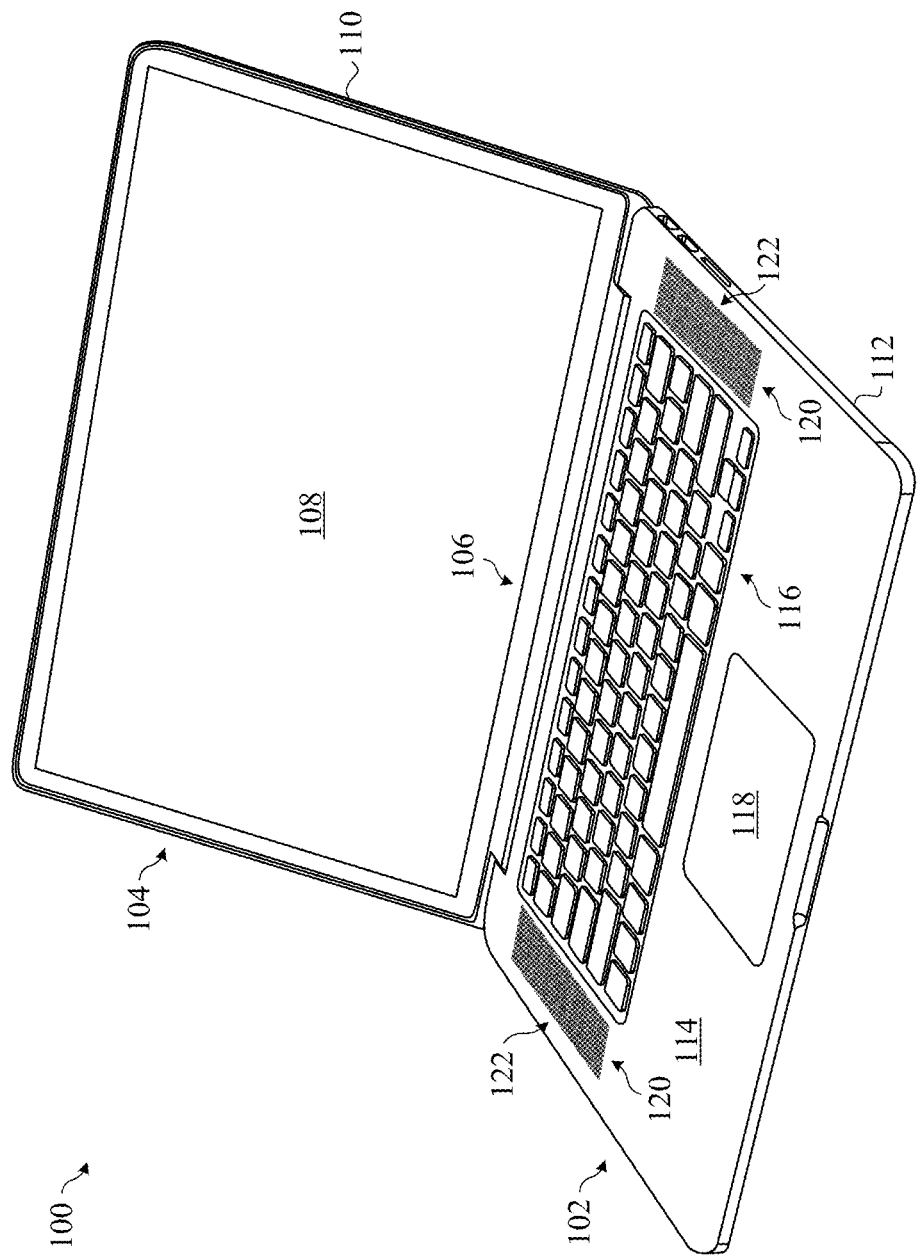
FIGS. 1A and 1B show perspective views of devices having perforated substrates.

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments.

Described herein are methods for providing perforated structures. The methods include providing an arrangement of different types of holes within a substrate such that the arrangement of holes is cosmetically appealing and the substrate retains a structural integrity. In particular embodiments, the methods involve providing a combination of through-holes that pass all the way through the substrate and blind-holes that pass partially through the substrate. The blind-holes allow more substrate material to remain intact and provide extra mechanical strength to the substrate than it would otherwise have with only through-holes. In some embodiments, the blind-holes are treated so that the blind-holes appear indistinguishable from the through-holes, which can improve the cosmetics of the perforated structure. In some cases, the treatment involves modifying inner surfaces of the blind-holes such that the inner surfaces appear darker.

In some embodiments, the perforated structures serve as speaker grids or microphone grids as part of a housing for an electronic device. The through-holes allow sound to pass through the housing to and/or from a user of the electronic device. The blind-holes can be arranged in a pattern amongst the through-holes to provide mechanical strength to the speaker grid. In some cases, the blind-holes hide one or more components housed within the housing. When treated, the blind-holes can be darkened and camouflaged to look like the through-holes, resulting in a uniform and cosmetically appealing arrangement of similar looking holes.

In some embodiments, ink is deposited on the inner surfaces of the blind-holes to give the blind-holes a darkened appearance. This can be accomplished using printing techniques, such as inkjet printing techniques. Inkjet printing is generally a non-contact printing technique where droplets of ink are propelled through a nozzle toward the substrate. This allows for accurate placement of the ink on the substrate and can also allow for small amounts of ink to be deposited and effectively cured at a time. The ink is printed onto inner surfaces of the blind-holes, such as the bottom or terminal surfaces of the blind-holes. In some embodiments, one or more ink layers are deposited. In some embodiments, the ink is selectively printed within the blind-holes without substantially depositing ink elsewhere on the substrate. In other embodiments, the ink is printed on an entire surface of the substrate, including within the blind-holes. This can be referred to as a flood printing technique. In some cases, a mask is used to mask off certain surfaces of the substrate. The ink can be dispensed either selectively into an area within and encircling the blind-holes or over the entire masked substrate surface. The mask can then be peeled off to reveal a clean substrate surface. In some cases, in addition to changing the optical properties of the blind-holes, the printing changes the thermal, mechanical and/or chemical properties of the substrate. Various types of inks can be used, such as a single colored ink, a mixture of colored ink and clear ink, or a multilayered ink that includes a clear ink layer over one or more colored ink layers.

As used herein, the terms "hole," "opening," "perforation" and "aperture" are used interchangeably and can refer to any suitable opening that is formed partially or fully through a substrate. The term "through-hole" refers to passageway that passes completely through a substrate. The terms "blind-hole" and "partial hole" refer to passageways that are formed a partial distance through a substrate and do not pass completely through the substrate.

Methods described herein are well suited for providing cosmetically appealing surface structures and designs for consumer products. For example, the methods described herein can be used to form cosmetically appealing perforated structures, such as speaker or microphone grids or grids for housing or enclosures for portable electronic devices, desktop computers, mobile electronic devices and electronic device accessories, such as those manufactured by Apple Inc., based in Cupertino, Calif.

These and other embodiments are discussed below with reference to FIGS. 1A-18. However, those skilled in the art will readily appreciate that the detailed description given herein with respect to these Figures is for explanatory purposes only and should not be construed as limiting.

Figure 1B:
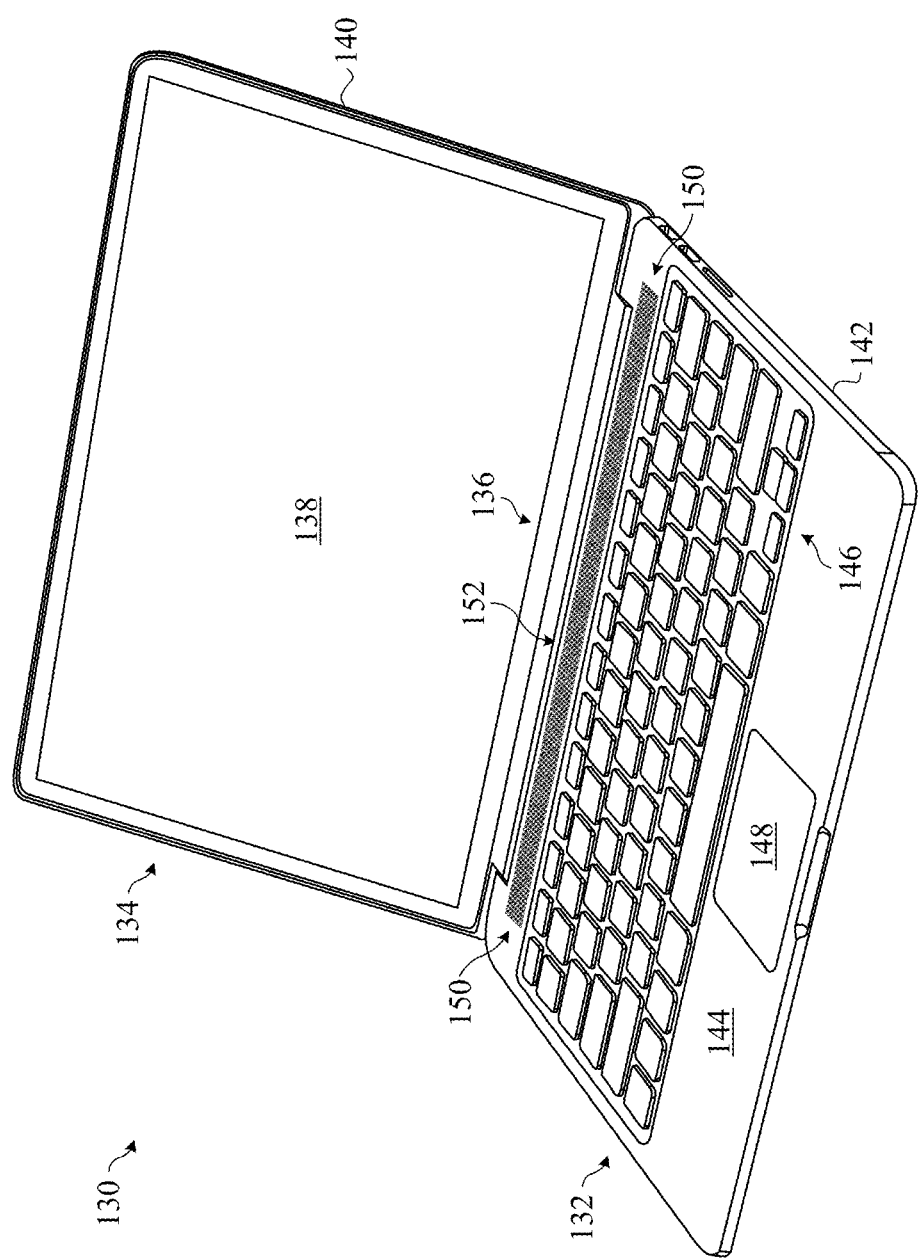

FIGS. 1A and 1B show front facing perspective views of portable computing devices 100 and 130, respectively, in accordance with some embodiments. FIG. 1A shows portable computing device 100 that can include base portion 102, which can be pivotally connected to lid portion 104 by way of clutch assembly 106 hidden from view. Lid portion 104 can be moved with the aid of clutch assembly 106 from a closed position to remain in an open position and back again. Lid portion 104 can include display 108 and rear cover 110 that can add a cosmetic finish to lid portion 104 and also provide structural support to display 108. Base portion 102 can define an internal chamber or cavity that houses internal components of portable computing device 100. Thus, base portion 102 can function as a housing. In some cases, base portion 102 includes bottom case 112 that is fastened to top case 114. Base portion 102 can be made of any suitable material, such as metal, plastic, ceramic or suitable combinations thereof. In some cases, base portion 102 is made of a metal alloy that provides a cosmetically appealing look to base portion 102 while providing structural integrity to base portion 102. Top case 114 can be configured to accommodate various user input devices such as keyboard 116 and touchpad 118, which can be configured to receive finger gesturing input from a user.

Top case 114 can include speaker grids 120 that port audio from speakers 122 enclosed within base portion 102. Speaker grids 120 are perforated regions within top case 114 that include a number of holes for allowing sound from speakers 122 to pass through base portion 102 and out of portable computing device 100. The holes of speaker grids 120 can be any suitable size and can be visible to a user of portable computing device 100. The holes of speaker grids 120 can be arranged in a cosmetically appealing pattern, such as a uniformly spaced array, and can be arranged to form any suitable design, such as a rectangular shape shown in FIG. 1A. In some cases, more holes are formed within speaker grids 120 than necessary for providing adequate sound passage in order to provide a cosmetically appealing design. However, providing more holes within top case 114 removes material from top case 114, which can mechanically weaken top case 114. For example, if top case 114 is made of a metal material, providing too many through-holes within speaker grids 120 can cause the metal material to lose mechanical strength and be more susceptible to bending, denting or other deformation. If top case 114 is made of a more brittle material, too many through-holes within speaker grids 120 can cause the material forming speaker grids 120 to be susceptible to breaking or cracking. Bending, denting, breaking, cracking or other deformation of top case 114 can compromise the structural integrity as well as detrimentally affect the cosmetic appearance of top case 114.

FIG. 1B shows portable computing device 130 that includes similar features as portable computing device 100. In particular, portable computing device 130 includes base portion 132 pivotally connected to lid portion 134 by way of clutch assembly 136 hidden from view. Lid portion 134 can include display 138 and rear cover 140, and base portion 132 can define an internal chamber or cavity that houses internal components of portable computing device 130. Base portion 132 includes bottom case 142 that is fastened to top case 144. Top case 144 can include keyboard 146 and touchpad 148. However, speaker grid 150 of portable computing device 130 is located in a different area than speaker grid 120 of portable computing device 100. In particular, speaker grid 150 is positioned over one or more speakers 152 located near clutch assembly 136. As shown, the holes of speaker grid 150 are arranged to have a different design or shape (a long rectangular shape) than the holes of speaker grid 150. As with the speaker grids 120 of portable computing device 100, providing too many through-holes within speaker grid 150 can make speaker grid 150 susceptible to bending, denting, breaking, cracking or other deformation.

Figure 2:
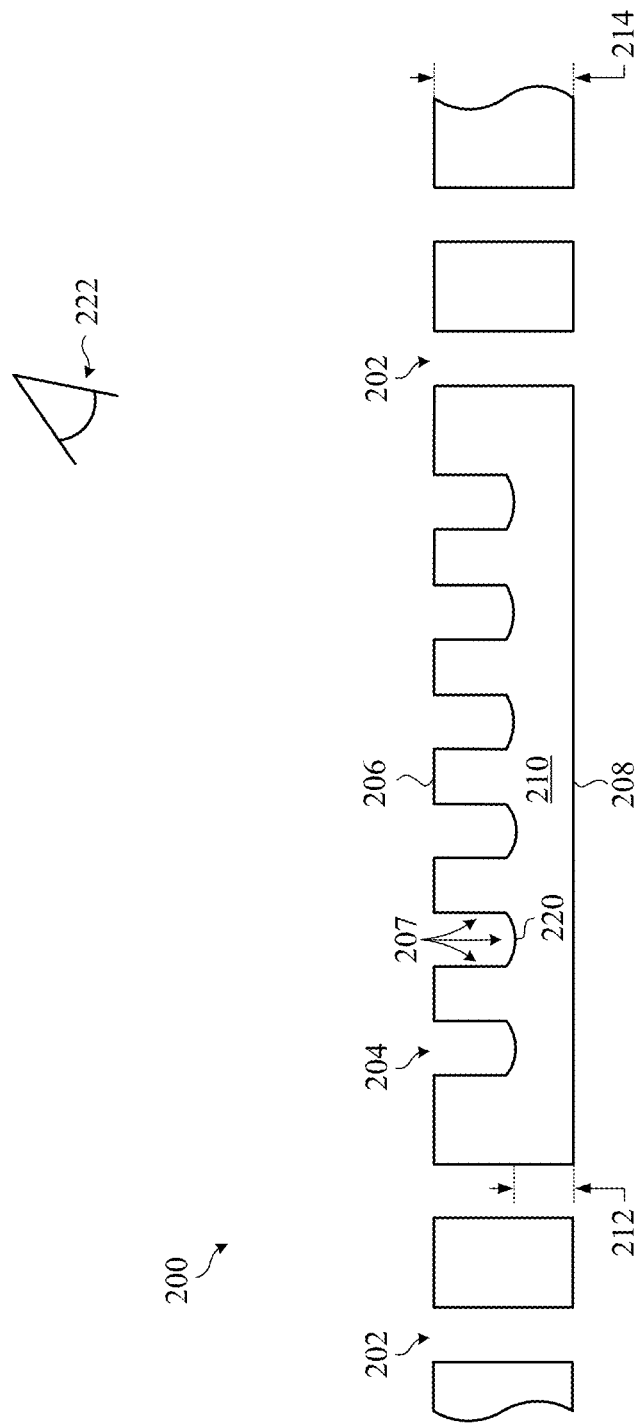
FIG. 2 shows a section view of a perforated substrate that includes through-holes and blind-holes.

Methods described herein can be used to overcome problems associated with through-holes within perforated structures, such as speaker grids 120 and 150. The methods involve replacing some of the through-holes within speaker grids 120 or 150 with partial holes that are formed partially though the substrate, sometimes referred to as blind-holes. FIG. 2 shows a section view of a portion of substrate 200, which includes a combination of through-holes 202 and blind-holes 204, in accordance with some embodiments. Substrate 200 can correspond to a portion of speaker grids 120 or 150. Thus, substrate 200 can correspond to an exterior wall or housing (e.g., top case 114 or 144), with exterior surface 206 corresponding to an exterior surface of a housing and interior surface 208 corresponding to an interior surface of the housing. Through-holes 202 are formed through an entire thickness 214 of substrate 200 to allow sound from one or more speakers to pass through substrate 200. Blind-holes 204 are formed partially through substrate 200 such that support portion 210 of substrate 200 remains intact. Support portion 210 can be characterized as having a thickness 212. The extra material provided by support portion 210 can provide more mechanical strength compared to a substrate that has through-holes 202 in place of blind-holes 204. This can make speaker grids 120 or 150 more resistance to deformation when exposed to an impact event, such as a drop event or by an object falling onto speaker grids 120 or 150.

One of the problems associates with forming blind-holes 204 is that blind-holes 204 can appear different than through-holes 202 by observer 222 viewing exterior surface 206. This can be due to different behavior of light reflected from through-holes 202 versus blind-holes 204. For example, if substrate 200 corresponds to top case 114 or 144 (portable computing devices 100 and 130, respectively) light can enter and pass all the way through through-holes 202 and reach the internal chamber or cavity, generally giving through-holes 202 a black or otherwise dark color. In contrast, light entering blind-holes 204 can be reflected off of surfaces of inner walls 207 that define blind-holes 204, such as terminal surfaces 220. Terminal surfaces 220 are at the end or bottom of blind-holes and can correspond to surfaces that are most viewable from observer 222. Terminal surfaces 220 can be referred to as sub-surfaces due to the position of terminal surfaces 220 relative to exterior surface 206. If substrate 200 is made of a metallic material, terminal surfaces 220 can be especially reflective and appear light in color compared to the darker through-holes 202. This visual distinction between through-holes 202 and blind-holes 204 can adversely affect the cosmetic appearance of substrate 200. For example, some of the holes of speaker grids 120 or 150 may appear lighter than others, giving speaker grids 120 or 150 a non-uniform appearance.

Figure 3A:
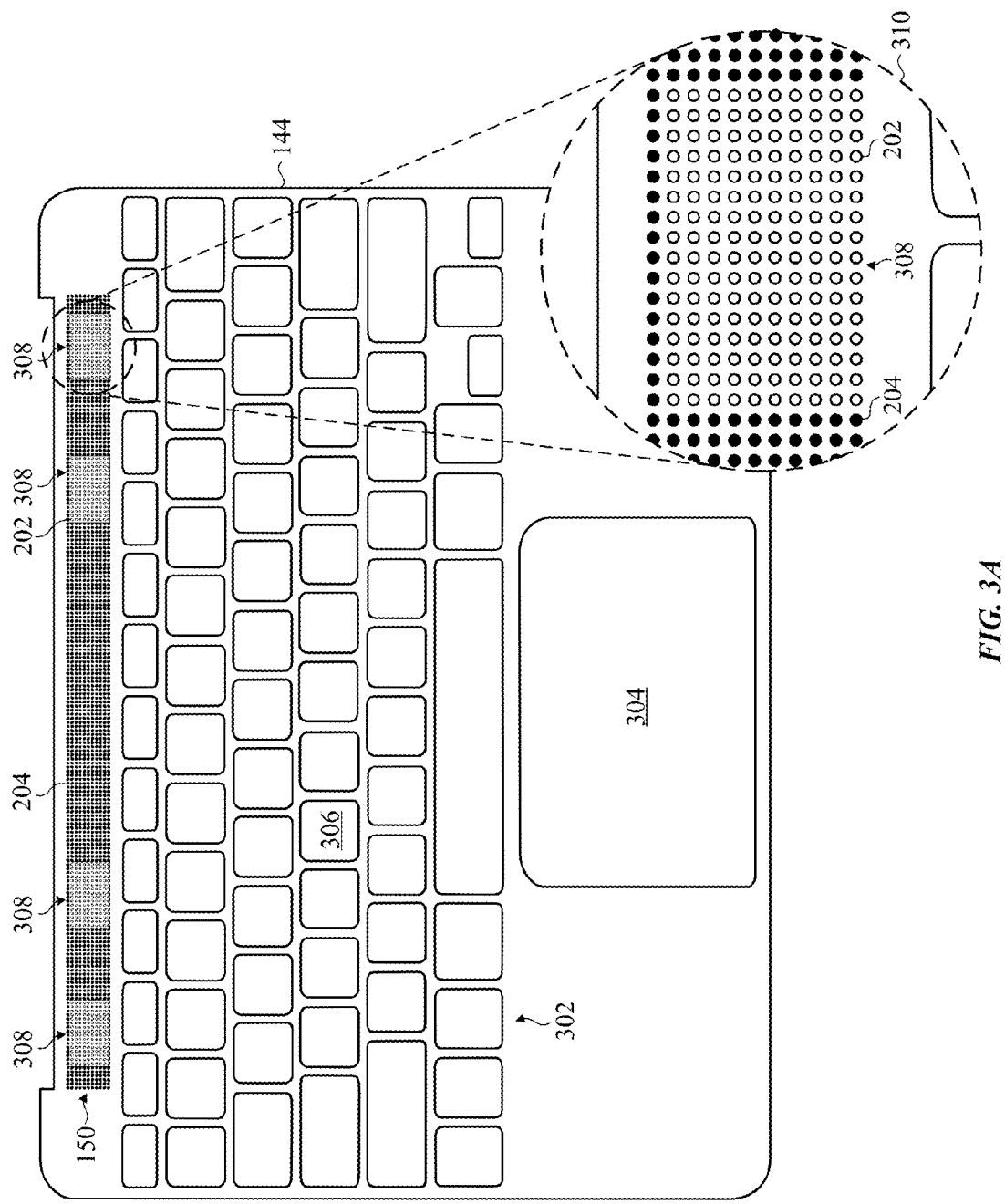
FIGS. 3A and 3B show front views of a top case of a portable computing device before and after a blind-hole darkening procedure.
Figure 3B:
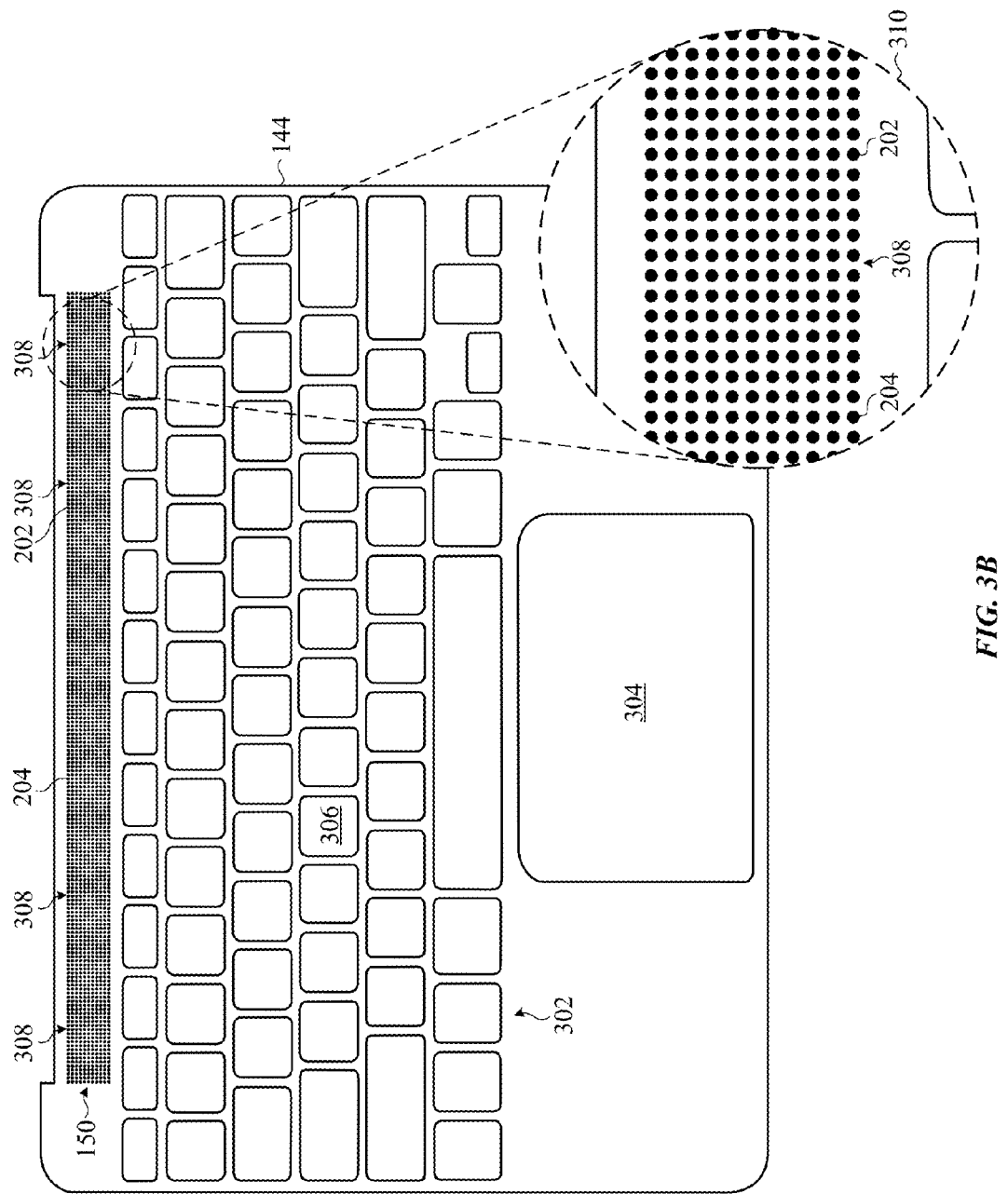

To address this issue, described herein are methods for modifying the appearance of blind-holes 204 such that blind-holes 204 appear indistinguishable from through-holes 202 when viewed by observer 222. In particular embodiments, the methods involve darkening blind-holes 204 so that they appear to provide access to the internal chamber of base portion 102 like through-holes 202. To illustrate, FIGS. 3A and 3B show exterior views of top case 144 disassembled from portable computing device 130 shown in FIG. 1B. FIG. 3A shows top case 144 before darkening of blind-holes 204 and FIG. 3B shows top case 144 after darkening of blind-holes 204, in accordance with described embodiments. Note that the embodiments described below with reference to FIGS. 3A and 3B can also be used to form modified blind-holes within top case 114 of portable computing device 100 shown in FIG. 1A, or any other suitable consumer electronic device casing such as a casing for a tablet computer, desktop computer or mobile phone. The methods described herein can also be used to form other types of perforated structures, such as microphone grids that allow access to one or more microphones as part of a housing. In some embodiments, the perforated structures are cosmetic portions of the housing and do not serve to provide access to a particular component within the housing. The perforated structure can be an integral part of the housing itself or can constitute a separate piece that can be coupled to a housing.

Top case 144 can be divided into various areas, such as keyboard area 302, touchpad area 304 and speaker grid 150. In some cases, top case 144 is made of a singular material, such as a metal or metal alloy material. In a particular embodiment, top case 144 is made of an aluminum alloy. In some embodiments, keyboard area 302 can include openings 306 for accommodating keys of portable computing device 130. Touchpad area 304 can be configured to accommodate a touchpad assembly. As shown in close-up inset view 310, speaker grid 150 can include through-holes 202 and blind-holes 204 that combine to form a pattern of holes within top case 144. In this case, through-holes 202 and blind-holes 204 are arranged approximately equidistant from each other and have substantially the same diameters, forming a rectangular shaped grid pattern. Blind-holes 204 are arranged around groups 308 of through-holes 202 within speaker grid 150. Through-holes 202 can allow sound from underlying speakers to pass through top case 144. In this particular embodiment, speaker grid 150 includes four groups 308 of through-holes 202, with each group 308 having a rectangular shape. Blind-holes 204 do not pass all the way through top case 144, thereby forming support portion 210 (shown in FIG. 2) that provide more mechanical strength to speaker grid 150 compared to a speaker grid having only through-holes 202. This can make speaker grid 150, and top case 144, more resistant to deformation, as described above.

Note that groups 308 are exemplary arrangements of through-holes 202 and are not meant to limit the scope of possibilities within the scope of described embodiments. For example, groups 308 can each have a circular shape, square shape, triangular shape, etc. In addition, any number of groups 308 can be formed within speaker grid 150. In some embodiments, through-holes 202 are arranged in rows and/or columns within speaker grid 150. In some cases, groups 308 are positioned to hide one or more components housed within base portion 132. In some cases, groups 308 are positioned away from corner or edge regions of a perforated structure to provide stiffness at the corner or edge regions. In some embodiments, through-holes 202 are not arranged in distinct clusters, but scattered amongst blind-holes 204. In some embodiments, through-holes 202 are provided only where needed and the rest of the holes are blind-holes 204. That is, the number of through-holes 202 can be minimized. In some embodiments, blind-holes 204 are arranged on non-flat (three-dimensional) surfaces, such as substrates having curved or stepped surfaces.

When top case 144 is assembled within portable computing device 130, through-holes 202 provide access to an internal chamber that houses one or more speakers. In this way, through-holes 202 can allow sound from the one or more speakers to pass through top case 144 and to a user of portable computing device 130. Unfortunately, blind-holes 204 can appear lighter than through-holes 202. As described above, this can be due to light reflecting off of inner surfaces of blind-holes 204. If top case 144 is made of a metal material, the inner surfaces of blind-holes 204 can be especially reflective due to the light reflective qualities of many metal materials. FIG. 3B shows top case 144 after inner surfaces of blind-holes 204 have been modified. For example, the inner surfaces of blind-holes 204 can be darkened with a surface modification process or covered with one or more darkening agents to reduce or eliminate reflectance of light that reaches the inner surfaces of blind-holes 204. This results in a uniform appearing and cosmetically appealing speaker grid 150 from the perspective of the user.

Described below are different methods for modifying the appearance of blind-holes 204 such that they appear identical to or similar to through-holes 202. According to some embodiments, the methods involve darkening blind-holes 204 using a laser. For example, a laser beam from a laser can be directed toward blind-holes 204 impinging on surfaces of the inner walls of blind-holes 204. The laser beam can have a laser beam energy sufficient to chemically modify and darken the surfaces of inner walls 207. In some embodiments, the laser beam oxidizes carbon-containing material within substrate 200 creating a black colored surface within blind-holes 204. It may be difficult, however, to laser darken some substrate materials, such as those that do not contain carbon. In addition, the use of a laser generally requires accurately directing the laser beam within each blind-hole 204, which can be time consuming and impractical when substrate 200 contains many blind-holes 204.

In some cases, a faster and more versatile darkening technique involves covering the inner surfaces within the blind-holes 204 with one or more materials, such as a dark colored ink. Described below are details of different ink depositing methods used to darken the appearance of blind-holes 204. Note that the methods described below are not meant to limit the scope of possible methods for modifying and darkening blind-holes 204 and that other suitable methods can be used. In addition, the methods below can be used in any suitable combination in order to achieve a desired appearance of blind-holes 204 and/or through-holes 202. In some embodiments, the ink depositing methods are combined with other darkening methods, such as the laser darkening methods described above. Those of skill in the art can appreciate that in addition to changing the appearance (optical properties) of blind-holes 204 and/or through-holes 202, the methods described herein can be applied to change the thermal, mechanical, and chemical properties of substrate 200.

Figure 4A:
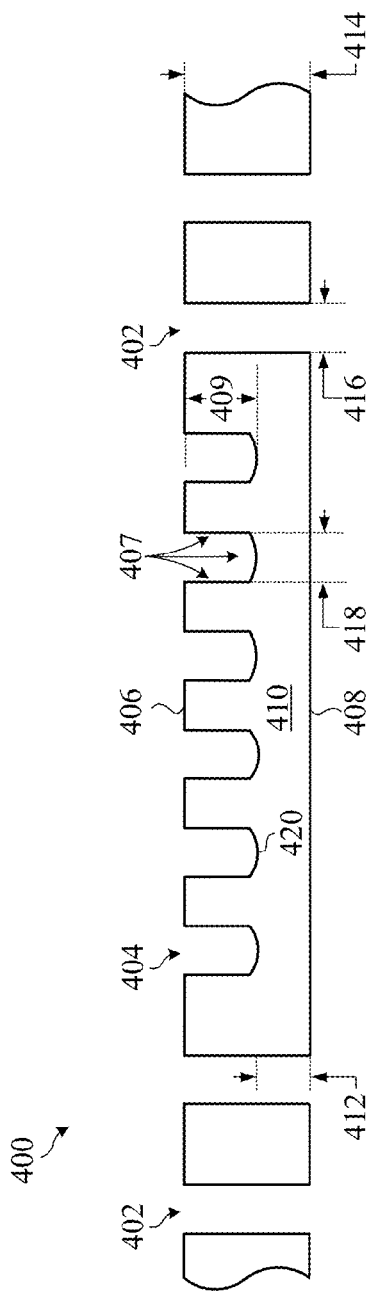

FIGS. 4A-4D show section views of perforated substrate 400 undergoing a selective ink coverage process, in accordance with some embodiments. FIG. 4A shows substrate 400 after one or more hole forming processes to form through-holes 402 and blind-holes 404. Inner walls 407 define boundaries and shapes of blind-holes 404. Substrate 400 can correspond to an exterior wall or housing (e.g., top case 114 or 144), with exterior surface 406 corresponding to an exterior surface of a housing and interior surface 408 corresponding to an interior surface of the housing. Substrate 400 can be made of any suitable material, including metal, plastic, ceramic, glass or a combination thereof. In some embodiments, substrate 400 is made of a metal alloy, such as an aluminum alloy. In some embodiments, substrate 400 is anodized prior to or after forming through-holes 402 and blind-holes 404. Thus, the surface of substrate 400 can be anodized and different than inner metal surfaces of blind holes 404, such as terminal surfaces 420.

Through-holes 402 and blind-holes 404 can be formed using any suitable method, including drilling (e.g., mechanical or laser drilling). In some embodiments, through-holes 402 and blind-holes 404 are formed using computer numerical control (CNC) methods. In some embodiments, through-holes 402 and blind-holes 404 are formed in a single process, such as a single drilling process. In other embodiments, through-holes 402 and blind-holes 404 are formed in separate drilling processes. The size and shape of each of through-holes 402 and blind-holes 404 can vary depending on design requirements and on manufacturing processes. In some embodiments, blind-holes 404 have curved or non-planar terminal surfaces 420, which can be a product of the drilling process. For example, if a mechanical drill is used to form blind-holes 404, terminal surfaces 420 can be associated with a shape of the drill bit that is used. In some embodiments, through-holes 402 and blind-holes 404 are drilled using a drilling machine with drill bit point angle of 130 degrees or 150 degrees. In other embodiments, terminal surfaces 420 have a different shape, such as a substantially flat shape that can be formed using, for example, a laser drilling process. In some cases it is found that shallower or flatter terminal surfaces 420 results in better ink coverage and improved darkening of blind-holes 404.

In some embodiments, each of through-holes 402 has substantially the same diameter and each of blind-holes 404 has substantially the same diameter. In some embodiments, average diameter 416 of through-holes 402 is substantially the same as average diameter 418 of blind-holes 404. In other embodiments, average diameter 416 of through-holes 402 is different than average diameter 418 of blind-holes 404. In some applications, the average diameter 416 of through-holes 402 and average diameter 418 of blind-holes 404 are each less than about 1 mm, such as about 0.5 mm or less. In a particular embodiment, average diameter 416 of through-holes 402 and average diameter 418 of blind-holes 404 are each around 0.35 mm. The average depth 409 of blind-holes 404 can vary depending on design requirements as well as a desired average thickness 412 of support portion 410. In some embodiments, blind-holes 404 have substantially the same depth while in other embodiments blind-holes 404 have varying depths. Thickness 414 of substrate 400 can vary depending on design. In some embodiments, blind-holes 404 are formed about halfway through thickness 414 of substrate 400. In some embodiments, depth 409 of blind-holes 404 is at least about 100 micrometers. In a particular embodiment, the thickness substrate is about 600 micrometers, depth of blind-holes 404 ranges between about 200 micrometers and 300 micrometers, resulting in support portion 410 having a thickness 414 ranging between about 300 micrometers and 400 micrometers.

Figure 4B:
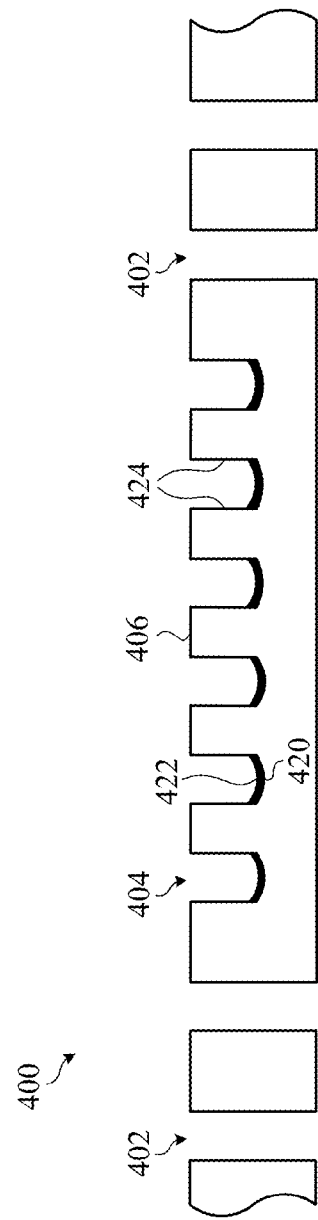

FIG. 4B shows substrate after coating 422 is selectively deposited onto surfaces of inner walls 407 that define blind-holes 404, such as terminal surfaces 420. Coating 422 covers terminal surfaces 420 so as to darken the appearance of blind-holes 404 as viewed by an observer viewing exterior surface 406. This is because coating 422 can be configured to absorb light entering blind-holes 404 and incident coating 422 such that a darkened appearance of the blind-holes 404 is perceived as the darkened appearance of through-holes 402. For example, light incident upon the through-hole openings of through-holes 202 passes through through-holes 202 and into an internal cavity of housing 144 such that substantially no light reflects back through through-holes 202. This results in the through-hole openings of through-holes 202 having a darkened appearance with respect to an exterior surface of housing 144. In addition, substantially no light incident upon coating 422 reflects back through blind-holes 404 such that the blind-hole openings of blind-holes 404 are perceived as having the darkened appearance of the through-hole openings of through-holes 202. In this way, blind-holes 404 can be camouflaged as through-holes 402.

Coating 422 can be made of any suitable material, such as ink. If a printing process is used, the selective coating operation can be referred to as a selective printing process. Note that in some embodiments coating 422 can also cover portions of other surfaces within blind-holes 404, such as sidewalls 424. In some embodiments, the selective depositing avoids depositing coating 422 onto exterior surface 406. This can be accomplished using an ink printer that is designed to accurately dispense ink in predetermined two-dimensional locations. For example, ink-dispensing nozzles of an inkjet type printer can be scanned or passed over exterior surface 406 of substrate 400 to selectively deposit coating within blind-holes 404. In a particular embodiment, an adjustable X-Y translation stage is attached to a printer table of the printer in order to obtain accurate control of ink depositing. In one embodiment, a camera is used to capture an image of patterns of ink dots deposited onto test samples and displayed on a monitor. Test samples can be analyzed to determine the sizes (e.g., diameters) and X-Y locations of the each of ink dots such that each ink dot is accurately deposited within each blind-hole 404.

The method used to deposit coating 422 can depend in part on the size (i.e., diameters) of blind-holes 404. For example, the deposition technique should be able to form droplets of ink that are small enough to fit within blind-holes 404. If blind-holes 404 have small diameters, some spraying techniques may not be able to form ink droplets small enough to provide adequate displacement of air from blind-holes 404 during the deposition process, resulting in the ink not getting deposited within blind-holes 404. Thus, the method used should be able to provide ink droplets sufficiently small to overcome any surface tension created when deposited within blind-holes 404 and allow dislocation of air trapped within blind-holes 404 during the depositing. In some embodiments, the ink droplet size is less than about 100 microliters, and in a particular embodiment, between about 10 and 100 microliters. In some embodiments, this involves the use of ink jet dispenser systems where small droplets of ink are propelled through a nozzle. Examples of suitable equipment include flatbed printers, such those manufactured by Canon Inc. (Japan), Fujifilm (Japan), and Roland DG Corporation (Japan), which can produce droplets in the scale of picoliters. Other equipment can include piezoelectric style jet dispensers, such as PICO® Piezoelectric jet dispensing systems manufactured by Nordson Corporation (headquartered in Westlake, Ohio, U.S.), which can produce droplets as small as 2 nanoliters.

The angle at which the ink droplets deposit within blind-holes 404 can be controlled to some extent by the speed of the ink dispenser (e.g., ink jet nozzle) passing over substrate 400. In some embodiments, the speed of passing the ink dispenser is slow enough such that the ink droplets are directed substantially straight down toward substrate 400 (i.e., substantially normal to exterior surface 406). Faster speeds can cause the ink droplets to fall at non-normal angles with respect to substrate 400 such that the ink deposits more on one side of terminal surfaces 420, resulting in non-uniform coverage of terminal surfaces 420. Even faster speeds can result in ink accumulations along sidewalls 424.

Coating 422 can be made of any suitable colorant or combination of colorants. If coating 422 is made of ink, the ink should be sufficiently harden so that coating 422 does not run or drip out of blind-holes 404. In some embodiments, an ink that can be used in inkjet printers is used, such as various water-based inks, solvent based inks, latex inks, and UV/LED curable inks UV/LED curable inks can be particularly suitable when substrate 400 is part of a manufacturing product line (such as portable computing devices 100 and 130) since these inks generally cure very quickly at relatively low temperatures. Any suitable UV/LED curable inkjet printers can be used to dispense the inks, including some Arizona 400 series printers manufactured by Canon Inc. (Japan) and some UJF-3042 series LED curable inkjet printers manufactured by Mimaki Engineering Co., Ltd. (Japan).

In some embodiments, a dark colored and opaque ink is used, such as black ink. The black ink can be made either from a pure black ink (e.g., black 265) or from a mixture of colors, such as a CMYK (cyan, magenta, yellow, and black) mixture. In some embodiments, other combinations of inks with different colors are used. In some embodiments, the ink is mixed with a filler or binder material that provides more volume to coating 422 to ensure full coverage of terminal surfaces 420. The filler or binder material can itself have a color or can be substantially colorless. If an inkjet printer is used, the filler or binder material can be dispensed at the same time as the black ink using a separate ink jet nozzle so that a thicker layer of ink can be deposited per pass. In some embodiments, the filler or binder material is a clear colored ink, such as clear inks used to provide glossy appearance to prints. In a particular embodiment, a black colored ink is mixed with a clear colored ink. The viscosity of the ink should be sufficient to form small enough droplets of ink, as described above, but also to provide a good opaque color. Note that coating 422 can have any color and is not limited to black or dark colored ink material. For example, coating 422 can have a predetermined color to match a color of an object positioned on or near interior surface 408 and visible through through-holes 402.

In some cases, coating 422 is not deposited to a thickness great enough to sufficiently darken blind-holes 404. That is, coating 422 may be thin enough to allow some light to reflect off terminal surfaces 420, making blind-holes 404 still appear lighter than through-holes 402. Thus, it may be useful to measure the darkness of blind-holes 404 in comparison to through-holes 402. In some embodiments, optical images of blind-holes 404 and through-holes 402 are measure using a digital microscope, such as a Dino-LITE digital microscope manufactured by AnMo Electronics Corporation. Some images showing differences between blind-holes, through-holes and ink covered holes are described in the Examples provided below with reference to FIGS. 10A-18.

If it is determined that coating 422 is not thick enough to sufficiently darken blind-holes 404, at FIG. 4C coating 422 is thickened by depositing one or more additional layers of ink within blind-holes 404. For example, the ink dispensing nozzle of the printer can be passed one or more additional times over substrate 400 to dispense one or more additional layers of ink. The additional layers of ink can include one or more types of ink. Examples of some particular embodiments where a black and clear layer, followed by another black and clear layer, followed by a black layer of ink are deposited are described below with reference to FIGS. 10A-18. The type of coverage provided by coating 422 required to adequately darken inner surfaces 407 can depend on the depth 409 of blind-holes. For example, if average depth 409 of blind-holes 404 is shallow, it may only be necessary to cover terminal surfaces 420 without much coverage required over sidewalls 424 since it would be difficult for an observer to view sidewalls 424 from outside of exterior surface 406. However, if average depth 409 of blind-holes 404 is large (high aspect ratio), it may be necessary to provide coverage of some of sidewalls 424. This can be accomplished by thickening coating 422 to an extent that a sufficient amount of sidewalls 424 are covered.

When it is determined that terminal surfaces 420 of blind-holes 404 are sufficiently darkened, at FIG. 4D protective layer or coating 426 is optionally deposited onto coating 422. Protective coating 426 can prevent coating 422 from being dislodged from blind-holes 404 or prevent coating 422 from exposure to chemicals, such as chemicals used to clean substrate 400, and that can lead to loss or discoloration of coating 422 from blind-holes 404. In some embodiments, protective coating 426 can also reduce point reflection of coating 422, thereby providing a darker color to blind-holes 404. In some embodiments, protective coating 426 is substantially water resistant. Protective coating 426 can be made of any suitable material. In some embodiments, protective coating 426 is made of a clear ink, such as the clear ink that is mixed with a black ink for depositing coating 422 in some embodiments described above.

The selective printing process described above allows for selective coverage of coating 422 and protective coating 426 into blind-holes 404. This process can require accurate alignment, which can make the selective printing process challenging, especially when substrate 400 has many blind-holes 404 or when blind-holes 404 are located relatively far distances apart from each other. An alternative to selective printing is flood printing, which involves depositing ink over an entire surface portion of a substrate. FIGS. 5A-5D show perforated substrate 500 undergoing a flood printing process, in accordance with some embodiments.

Figure 5A:
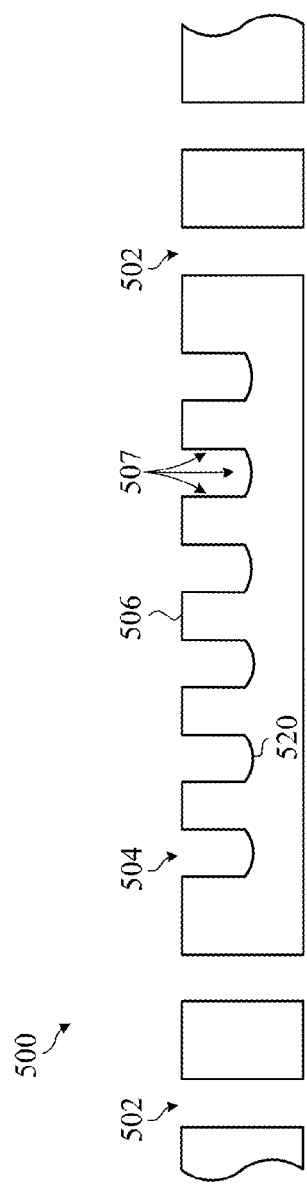
Figure 5B:
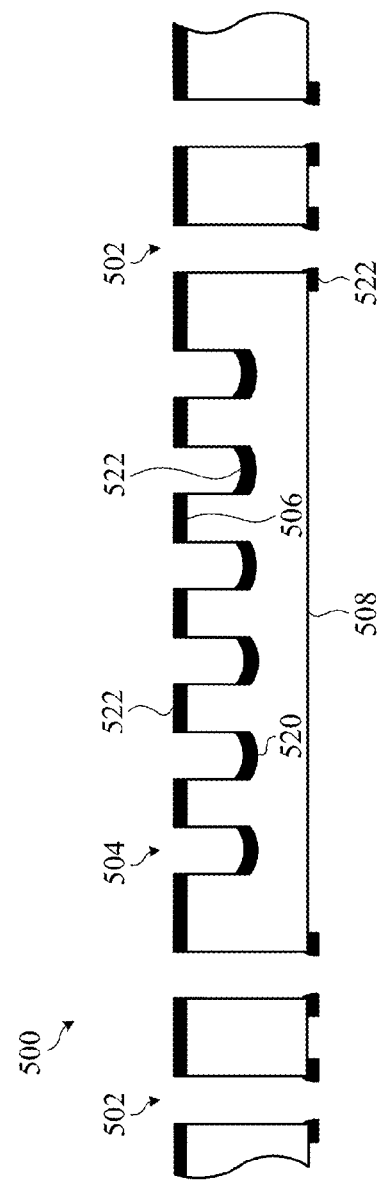

At FIG. 5A through-holes 502 and blind-holes 504 are formed within substrate 500. Blind-holes 504 include inner walls 507 that define blind-holes 504, which include terminal surfaces 520. Any suitable hole forming process can be used, as described above with reference to FIG. 4A. Exterior surface 506 can correspond to an exterior surface of a housing, such as an exterior surface of top case 114 or 144. FIG. 5B shows substrate 500 after coating 522 is deposited onto surfaces of inner walls 507, such as terminal surfaces 520, as well as exterior surface 506. Coating 522 can be made by depositing multiple layers of ink until coating 522 sufficiently covers terminal surfaces 520, as described above with reference to FIGS. 4B and 4C. In some embodiments, portions of coating 522 pass through through-holes 502 and collect at interior surface 508 proximate to through-holes 502.

FIG. 5C shows substrate 500 after protective coating 526 is optionally applied over coating 522. Protective coating 526 can prevent exposure of coating 522 to chemicals and can be made of any suitable material, as described above with reference to FIG. 4D. In some embodiments, portions of protective coating 526 pass through through-holes 502 and collect near interior surface 508 proximate to through-holes 502. Note that in some embodiments, depositing coating 522 (FIG. 5B) or depositing protective coating 526 (FIG. 5C) involves a selective depositing within blind-holes 504 without substantially depositing onto exterior surface 506 and/or interior surface 508.

FIG. 5D shows portions of coating 522 and/or protective coating 526 removed from exterior surface 506 and interior surface 508, leaving coating 522 and protective coating 526 on terminal surfaces 520 of blind-holes 504. In some embodiments, the removal is accomplished by pressing an adhesive tape onto each of exterior surface 506 and interior surface 508 and removing the adhesive tape with portions of coating 522 and protective coating 526 adhered thereon. In some embodiments, the removal is accomplished by wiping each of exterior surface 506 and interior surface 508 using a solvent, such as an alcohol solvent. In some embodiments, a combination of adhesive tape and solvent wiping are used.

Figure 6:
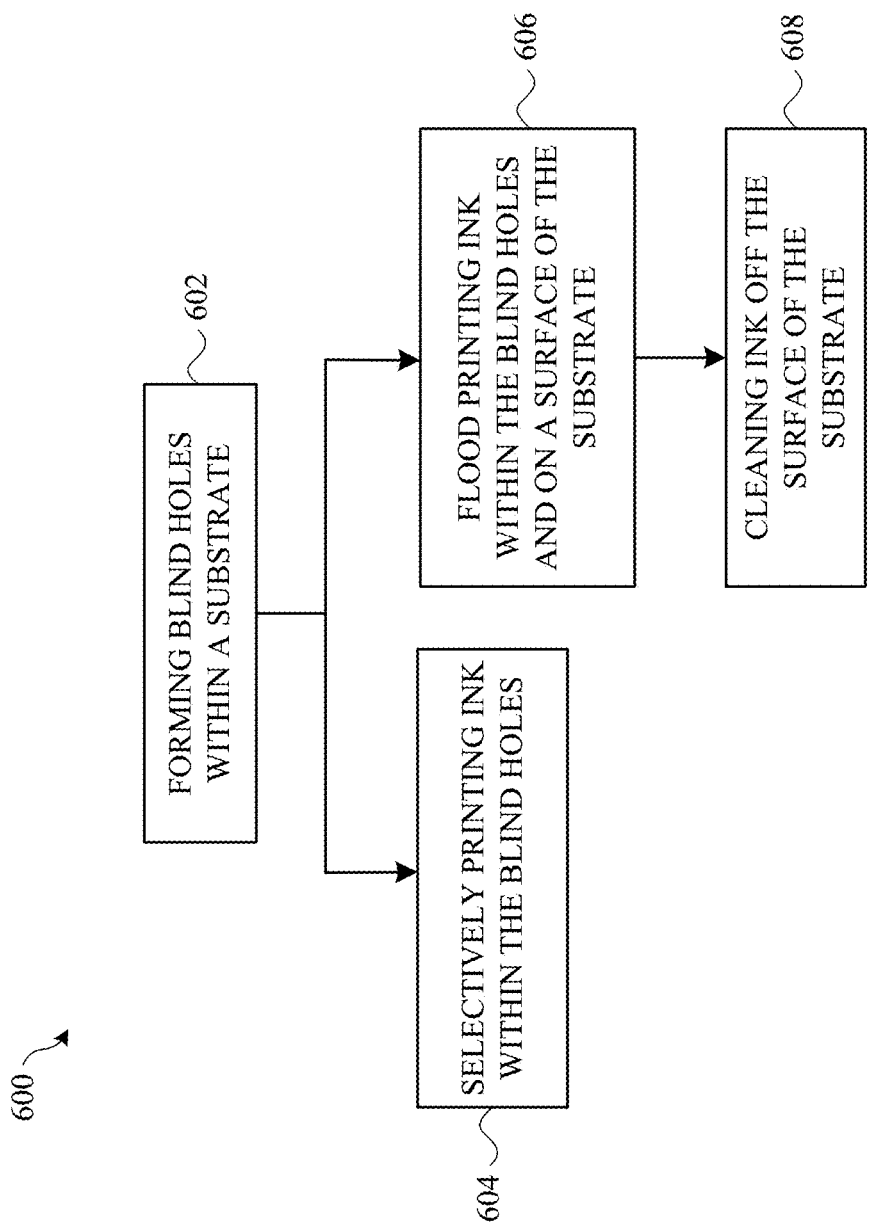
FIG. 6 shows a flowchart indicating an ink coverage process for darkening blind-holes in accordance with FIGS. 4A-4D and 5A-5D.

FIG. 6 shows flowchart 600 indicating an ink coverage process for darkening blind-holes, in accordance the methods described above with reference to FIGS. 4A-4D and 5A-5D. At 602, one or more blind-holes are formed within a substrate. The substrate can be made of any suitable material including metal, plastic, ceramic, glass or a combination thereof. The blind-holes can be formed using any suitable process, including a mechanical drilling process, a laser drilling process or a combination thereof. The blind-holes can be situated adjacent to through-holes such that the blind-holes and through-holes are arranged in a predetermined cosmetically appealing pattern.

At 604, in some embodiments ink is selectively printed into the blind-holes without being substantially printed onto the surface of the substrate. This can be accomplished using a positioning device that adjusts the relative position of the substrate with respect to the printer, and a detection device (e.g., camera) that can detect the position of the blind-holes within the substrate. The ink can be deposited to a predetermined thickness. The predetermined thickness can be associated with an amount of coverage of inner surfaces of the blind-holes sufficient to darken the appearance of the blind-holes to a predetermined amount when viewed from a top surface of the substrate. The darkness of the blind-holes can be measured using an imaging device such as a digital microscope. In some embodiments, the ink is deposited in multiple layers so as to accomplish the predetermined darkness. In some embodiments, a protective coating is deposited over the ink in order to keep the ink within the blind-holes and to prevent exposure of the ink from chemicals, such as chemicals used to clean the substrate.

At 606, in alternate embodiments ink is flood printed within the blind-holes and onto the surface of the substrate. Flood printing does not necessarily involve as accurate of substrate positioning and ink depositing as selective printing 604, and can therefore be more easily implemented than selective printing 604. As with selective printing 604, the ink can be deposited to a predetermined thickness associated with a predetermined appearance of the blind-holes. At 608, the ink is cleaned off the surface of the substrate such that ink remains within the blind-holes. The cleaning can involve use of an adhesive tape, solvent wiping, or both.

Figure 7C:
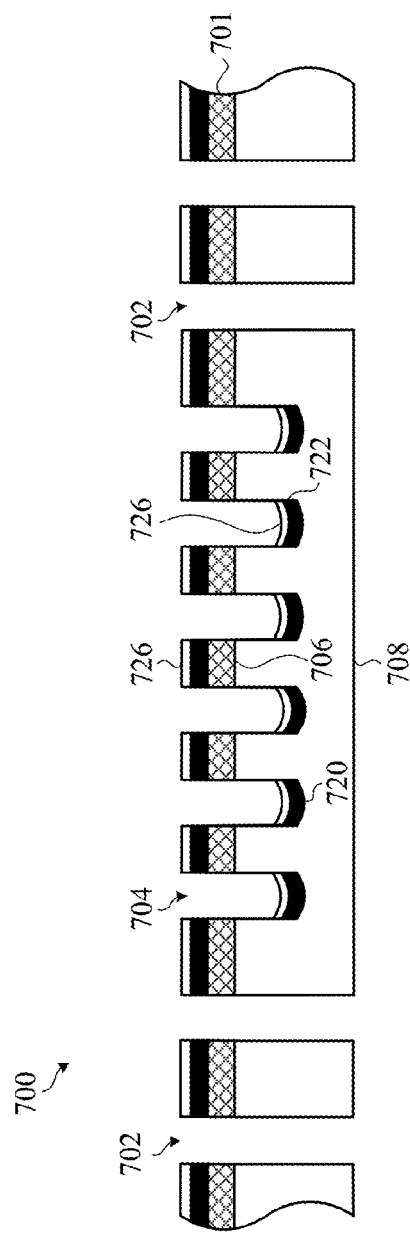

In some embodiments, a mask is used to mask off portions of a substrate prior to depositing ink. The mask can be positioned on the substrate prior to the hole forming process to assure accurate alignment of edges of the mask and the edges of the holes. To illustrate, FIGS. 7A-7D show perforated substrate 700 undergoing an ink depositing process that includes use of a mask, in accordance with some embodiments. FIG. 7A shows mask 701 formed on exterior surface 706 of substrate 700. Mask 701 should be deposited thick enough to provide substantially uniform coverage of exterior surface 706 and thin enough to avoid interference with a subsequent ink depositing process. Mask 701 should be durable enough to withstand degradation and peeling away from substrate 700 during a subsequent drilling process. In one embodiment, mask 701 is made of a laminated material that includes a plastic film, a pressure sensitive adhesive layer, and optionally a release liner. The release liner is removed prior to application. The plastic film should have enough strength so that it does not deform during a subsequent hole forming process. In a particular embodiment, mask 701 includes a plastic film made of a polyethylene terephthalate (PET) having a thickness ranging between about 25 micrometers and about 200 micrometers. In one embodiment, mask 701 includes a plastic PET film having a thickness ranging between about 50 micrometers and about 150 micrometers. In one embodiment, mask 701 includes a plastic PET film having a thickness ranging between about 75 micrometers and about 125 micrometers. The plastic film can be optically clear, translucent or opaque.

Mask 701 can be attached to substrate 700 by an adhesive layer, such as a pressure sensitive adhesive. In embodiments where mask 701 remains on exterior surface 706 during a subsequent hole forming process, the adhesive layer should have enough bonding strength so that mask 701 remains firmly in place on exterior surface 706 during the hole forming process. In addition, the adhesive layer should be easily removable from exterior surface 706 after ink depositing without leaving substantial residues on exterior surface 706. In some embodiments, the adhesive layer is chosen based on a peel value. In one embodiment, an adhesive layer having a peel value ranging between about 1N/25 mm and 6N/25 mm as measured on stainless steel ranges is used. In one embodiment, an adhesive layer having a peel value ranging between about 1.5 N/25 mm and 3N/25 mm as measured on stainless steel ranges is used. In one embodiment, the adhesive layer has a thickness ranging between about 5 grams per square meter (gsm) and 50 gsm. In one embodiment, the adhesive layer has a thickness ranging between about 10 gsm and 30 gsm. In one embodiment, the adhesive layer has a thickness ranging between about 15 gsm and 25 gsm. In some embodiments, more than one mask 701 is used within a single hole forming process.

Mask 701 can have different colors either by using a colored plastic film or a colored adhesive layer. Examples of suitable masks include certain paint masks, such as those manufactured by Avery Dennison Corp. (based in Pasadena, Calif.) and some R grade films manufactured by Worldmark International Ltd. (based in Glasgow, United Kingdom). In another embodiment, the mask 701 includes a dry adhesive layer. Examples of suitable dry adhesive layers include synthetic papers, such as some products manufactured by YUPO Synthetic Papers and Gecko grip materials pioneered by University of Massachusetts Amherst, Carnegie Mellon University, University of California in Berkeley, Karlsruhe Institute of Technology and others.

FIG. 7B shows substrate 700 after formation of through-holes 702 and blind-holes 704. Blind-holes 704 have inner walls 707 that define shapes and sizes of blind-holes 704. Any suitable hole forming process can be used, such as those described above with reference to FIGS. 4A and 5A. As shown, through-holes 702 and blind-holes 704 can be formed through mask 701 creating a corresponding pattern of holes within mask 701. In this way, the edges (perimeters) of the holes within mask 701 accurately correspond to the edges (perimeters) of through-holes 702 and blind-holes 704. Note that in some embodiments mask 701 is applied onto substrate 700 after through-holes 702 and blind-holes 704 are formed. In these embodiments, mask 701 can include openings corresponding to through-holes 702 and blind-holes 704, with the openings within mask 701 having diameters the same size or substantially larger than the diameters of through-holes 702 and blind-holes 704.

FIG. 7C shows substrate 700 after coating 722 and optional protective coating 726 are deposited onto mask 701 and onto surfaces of inner walls 707 that define blind-holes 704, such as terminal surfaces 720. As described above, coating 722 can include one or more layers of ink. Each layer of ink can include one or more types and colors of ink and can include filler or binder material, such as a clear ink. Protective coating 726 can be optionally applied over coating 722. Since mask 701 has holes with perimeters that accurately correspond to through-holes 702 and blind-holes 704, mask 701 prevents coating 722 and protective coating 726 from depositing onto exterior surface 706. In some embodiments, portions of coating 722 can be passed through through-holes 702 and become deposited on interior surface 708 (not shown). In these cases, interior surface 708 can be cleaned using one or both of an adhesive tape and solvent wiping, as described above with reference to FIG. 5D.

Figure 7D:
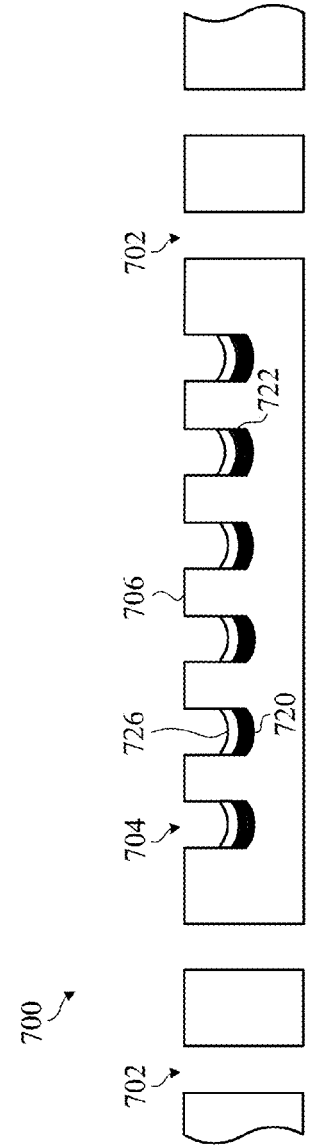

FIG. 7D shows substrate 700 after removal of mask 701. In some embodiments, exterior surface 706 required no further cleaning after removal of mask 701. In other embodiments, one or both of an adhesive tape and solvent wiping, as described above with reference to FIG. 5D is used to clean any ink residues from exterior surface 706.

Figure 8A:
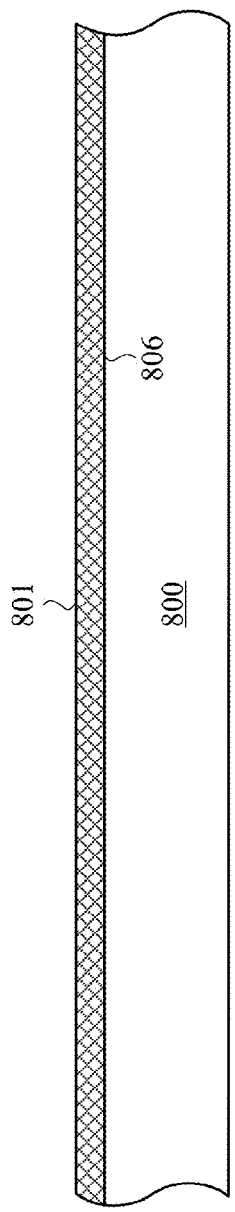
FIGS. 8A-8D show section views of a perforated substrate undergoing a masking and selective ink depositing process.
Figure 8B:
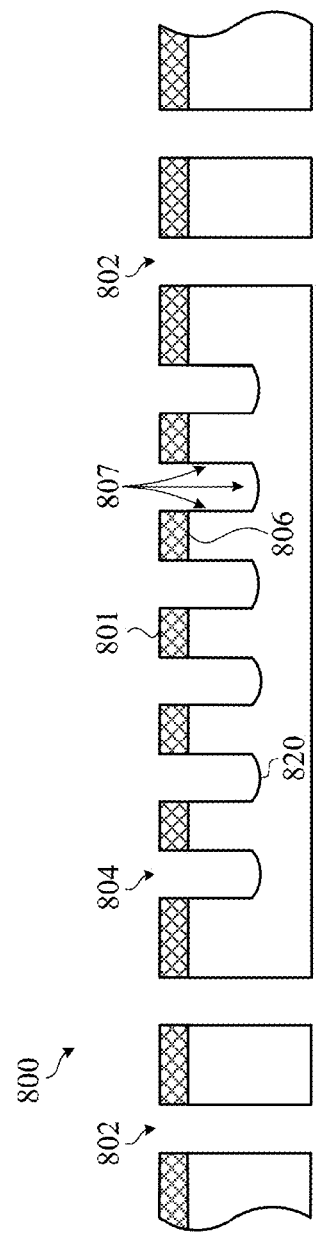

In some cases, a mask is used in conjunction with a selective depositing process, as shown in FIGS. 8A-8D. FIG. 8A shows mask 801 formed on exterior surface 806 of perforated substrate 800. Mask 801 can be made of any suitable material and can have any suitable thickness. In some embodiments, mask 801 is a laminated material with a plastic film, a pressure sensitive adhesive layer and optionally a release liner, as described above with reference to FIG. 8A. FIG. 8B shows substrate 800 after formation of through-holes 802 and blind-holes 804. Blind-holes 804 have inner walls 807 that define shapes and sizes of blind-holes 804. Any suitable hole-formation process can be used, such as described above. The hole-formation process can also form corresponding holes within mask 801.

Figure 8C:
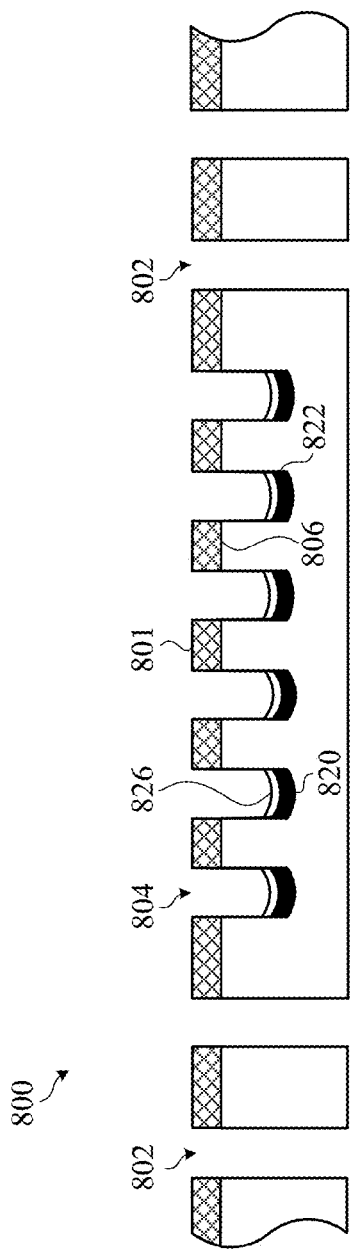
Figure 8D:
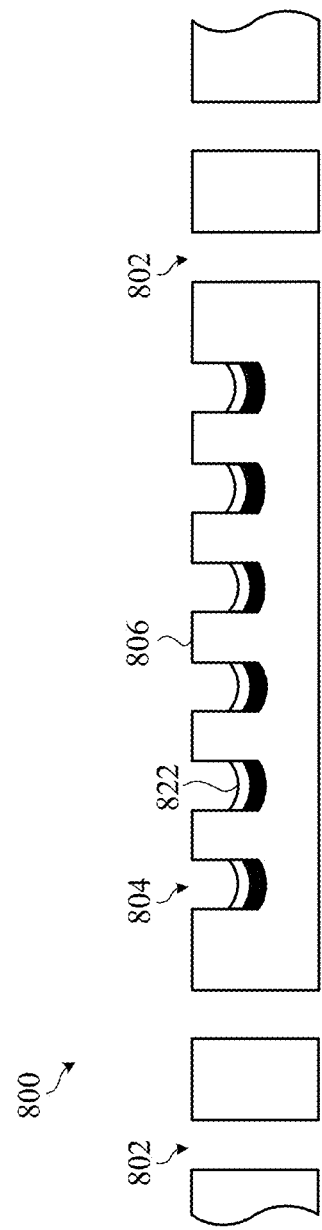

FIG. 8C shows substrate 800 after coating 822 and optional protective coating 826 are selectively deposited onto inner surfaces 807 of blind-holes 804, such as terminal surfaces 820. The selective depositing can be performed using a selective printing process, such as described above with reference to FIG. 4B, which involves tuning print locations based on two-dimensional coordinates (X-Y). As described above, it can be difficult to accurately align substrate 800 with respect to a printer such that coating 822 only deposits within blind-holes 804. However, since mask 801 has holes with perimeters that accurately correspond to through-holes 802 and blind-holes 804, mask 801 can prevent deposition onto exterior surface 806 due to any misalignment of substrate 800 with respect to the printer. Thus, the combination of mask 801 with selective depositing can provide good coverage of terminal surfaces 820 of blind-holes 804 while minimizing ink waste and clean up. FIG. 8D shows substrate 800 after mask 801 is removed providing a clean and ink-free exterior surface 806.

Figure 9A:
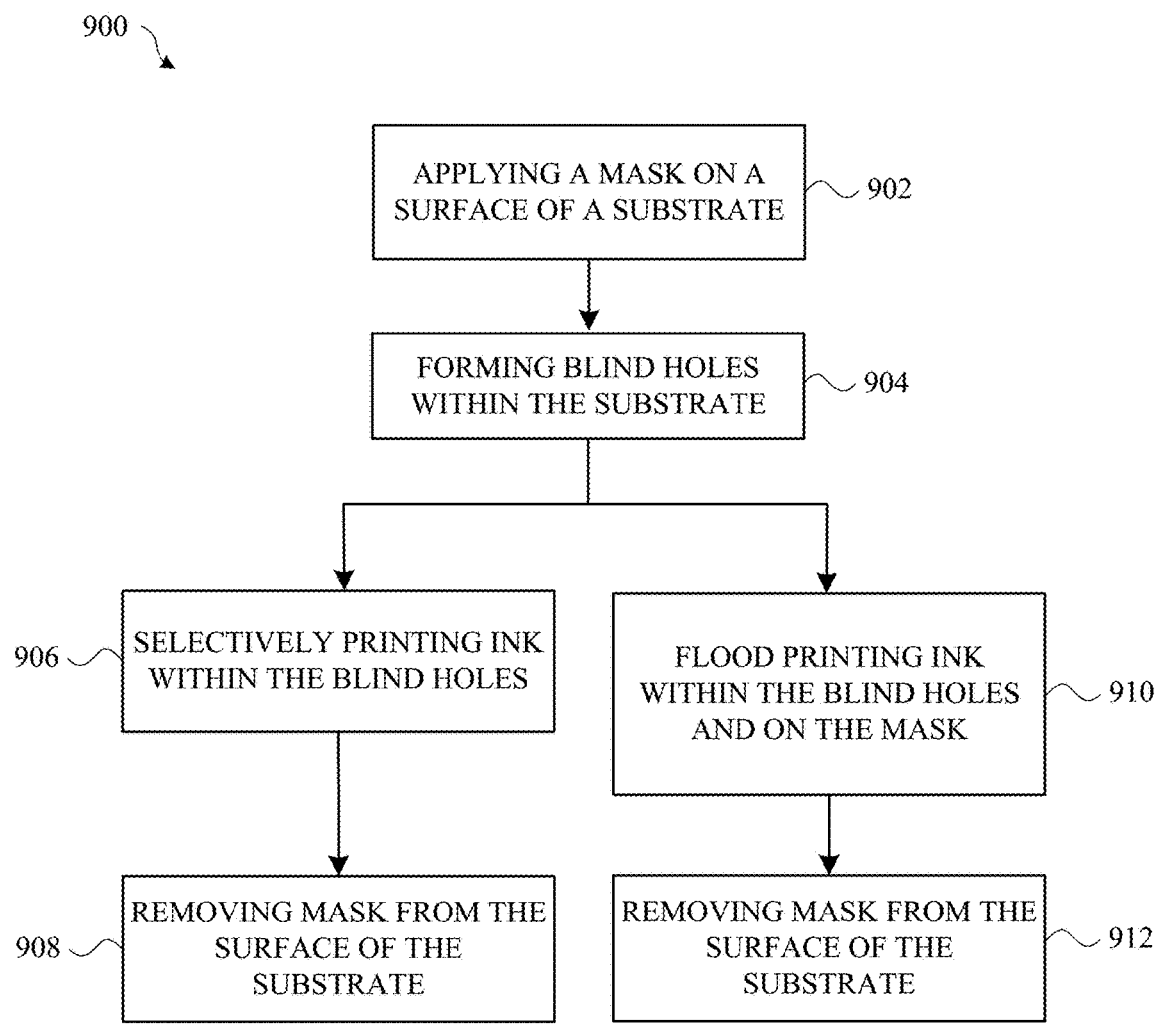
FIG. 9A shows a flowchart indicating an ink coverage process for masking and darkening blind-holes in accordance with FIGS. 7A-7D and 8A-8D.

FIG. 9A shows flowchart 900 indicating an ink coverage process for darkening blind-holes that includes use of a mask, in accordance with the methods described above with reference to FIGS. 7A-7D and 8A-8D. At 902, a mask is applied on a surface of a substrate. The substrate can be made of any suitable material including metal, plastic, ceramic, glass or a combination thereof. At 904, one or more blind-holes are formed within a substrate. Since the mask is positioned on the substrate, one or more holes are also formed within the mask corresponding to the one or more blind-holes of the substrate.

At 906, in some embodiments ink is selectively printed into the blind-holes. The presence of the mask covers the substrate surface along the perimeters of the blind-holes so that alignment of the selective printing is less critical compared to when no mask is used. This can provide good coverage within the blind-holes while minimizing ink waste. In some cases, multiple layers of ink are deposited within the blind-holes in order to provide adequate coverage and achieve a predetermined darkness of the blind-holes. In some embodiments, a protective coating is deposited over the ink in order to keep the ink within the blind-holes and prevent chemical exposure of the ink. At 908, the mask is removed from the surface of the substrate. The result is a clean substrate surface with ink-darkened blind-holes.

At 910, in alternate embodiments ink is flood printed within the blind-holes and the mask. As with selective printing 906, the ink can be deposited to a predetermined thickness associated with a predetermined appearance of the blind-holes. At 912, the mask is removed from the surface of the substrate taking along with it the excess ink deposited on the mask, resulting in a clean substrate surface with ink darkened holes.

Figure 9B:
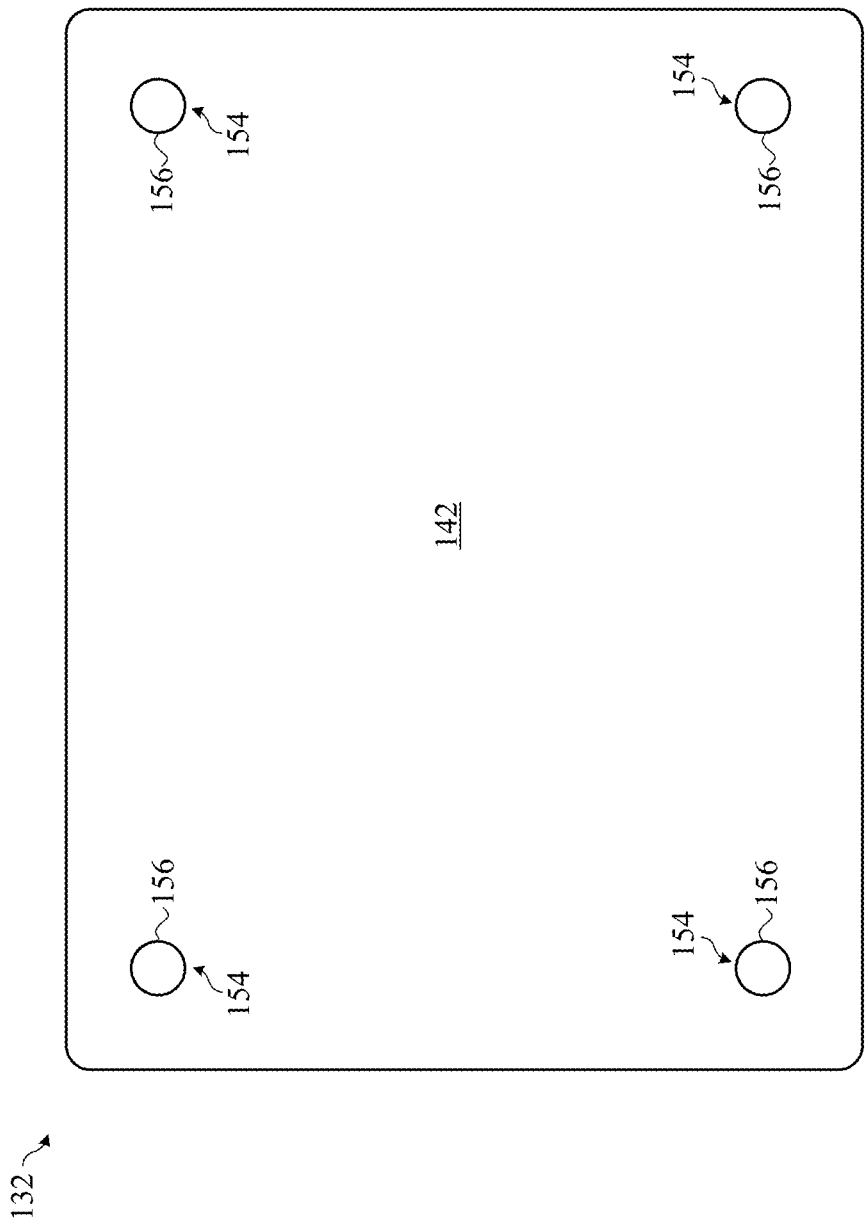
FIG. 9B shows a bottom view of the portable computing device shown in FIG. 1B illustrating a non-perforated structure that can be darkened using the methods described herein.

Note that the methods described herein can be used to darken structures other than perforated structures. For example, the methods can be used to provide cosmetically appealing seams or outlines of features. To illustrate, FIG. 9B shows a bottom view of base portion 132 of the portable computing device 130 described above with respect to FIG. 1B. FIG. 9B shows base portion 142, which can include feet 154 that protrude from a surface of base portion 142. Feet 154 can be configured to contact a support surface on which portable computing device 130 is placed. The perimeters of each of feet 154 can include gaps 156 that provide clean looking and cosmetically appealing outlines for feet 154. In some cases, it can be difficult to form gap 156 such that it forms a consistent and uniform outline to feet 154. The methods described above can also be used to darken gap 156 in order to provide clean looking outlines for feet 154. For example, an inkjet printer can be arranged to print and form an ink coating within each of gaps 156. The ink coatings can include multiple layers as well as a protective layer to prevent loss of the ink from within gaps 156. As described above, the thickness of the ink coating and protective coating can depend on the depth of gaps 156. Note that the outlining or darkening methods described herein are not limited to flat surfaces of substrates, but can also be applied to non-flat three-dimensional surfaces, such as curved or stepped surfaces.

EXAMPLES

Example 1

Imaging of Blind-Holes and Through-Holes

Figure 10B:
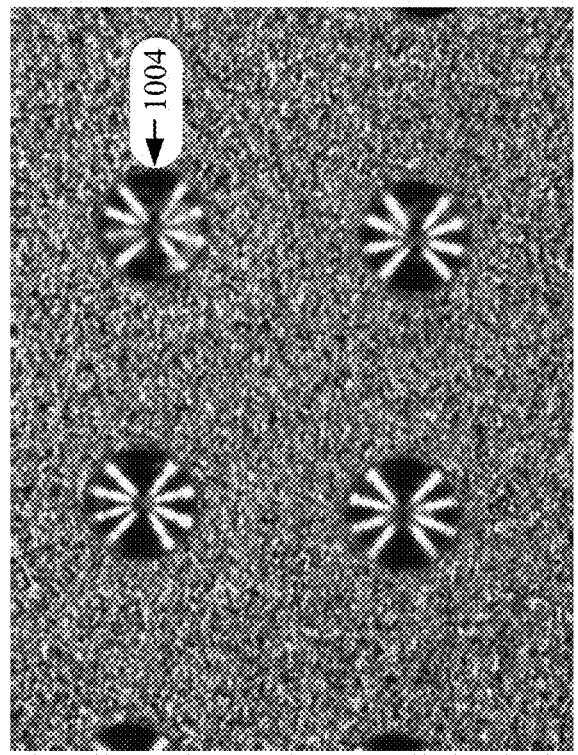
FIGS. 10A and 10B show images of substrate samples with through-holes and blind-holes prior to a darkening process.
Figure 10A:
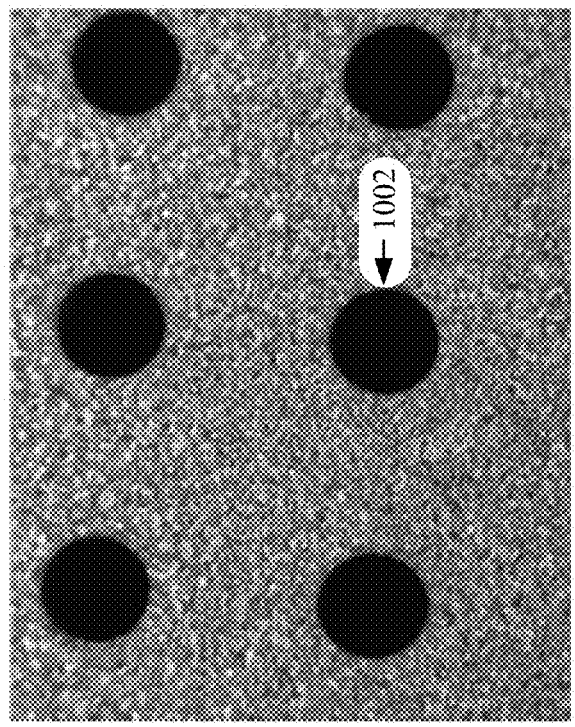

FIGS. 10A and 10B show images of through-holes 1002 and blind-holes 1004 using a Dino-LITE digital microscope. Through-holes 1002 and blind-holes 1004 were drilled in an anodized aluminum substrate using a Hitachi ND-6Ni210E machine with a 130 degree drill bit. The diameter of each of through-holes 1002 and blind-holes 1004 is about 0.4 mm. The depth of through-holes 1002 is about 0.6 mm and the depth of the blind-holes 1004 ranges from 0.2 mm and 0.3 mm. The images of FIGS. 10A and 10B show how through-holes 1002 appear darker than blind-holes 1004. In particular, blind-holes 1004 appear shiny due to the highly reflective terminal surface of blind-holes 1004.

Example 2

Selective Printing Process

Through-holes and blind-holes were drilled in an anodized aluminum alloy substrate. Canon Arizona 480GT UV/LED printer was used to selectively print within the blind-holes. The printer has 8 color ink channels having CMYK, Lc, Lm, W, and W/C and two mercury lamps for curing. An adjustable X-Y translation stage was attached to the printer table via double-sided tape. A plastic film was attached to the X-Y translation stage via a double-sided adhesive. A CCD Camera was used to capture the image of the plastic film and displayed on a monitor. A template image including black dots matching the size of the blind-holes was printed onto the plastic film and displayed on the monitor. The plastic film was then removed and the substrate was mounted onto the X-Y translation stage via a double-sided adhesive tape. The position of the substrate was adjusted to match at least two of the blind-holes with the printed dots shown on the monitor. The template image was then printed and ink dispensed onto the blind-holes.

Example 3

Masked Printing Process Using One Black Ink Layer

Figure 11B:
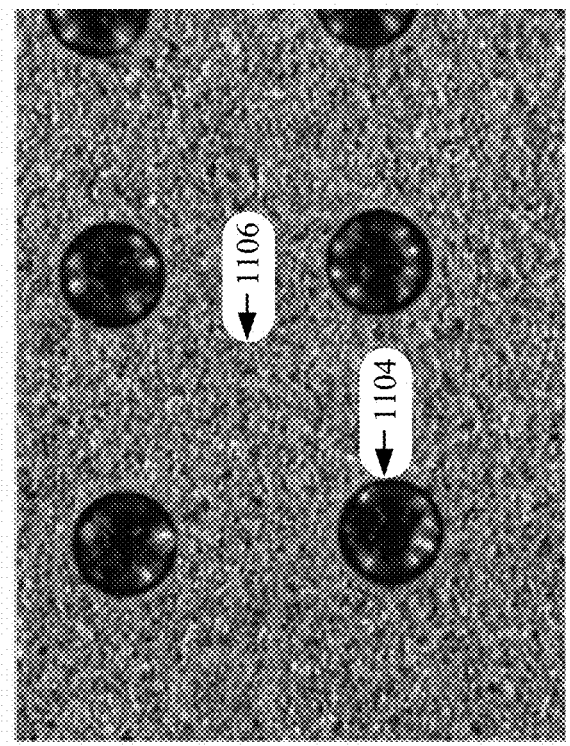
FIGS. 11A and 11B show images of substrate samples with through-holes and blind-holes that were printed with one layer of black ink.
Figure 11A:
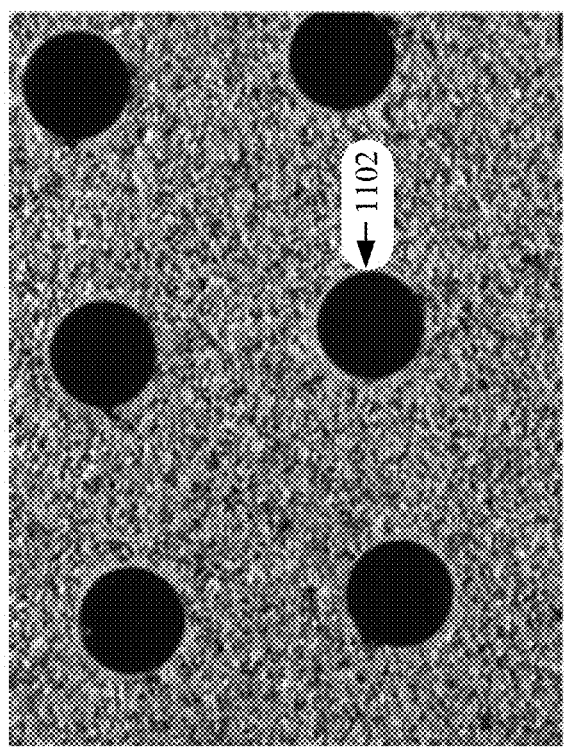

FIGS. 11A and 11B show images of through-holes 1102 and blind-holes 1104 that were deposited with one layer of black ink. The images were taken using a Dino-LITE digital microscope. The printing process involved applying a mask having a 100 micrometer thick polyethylene terephthalate (PET) film and a 20 micrometer thick removable acrylic pressure sensitive adhesive (F0418 manufactured by Avery Dennison Corporation) to the substrate. Blind-holes 1104 and through-holes 1102 were drilled in the substrate through the mask with a 130 degree drill bit. Black ink was flood printed onto the substrate and into blind-holes 1104 using the Canon Arizona 480GT UV/LED printer using the printing parameters provided in Table 1 below.

TABLE 1

| Parameter | Value |
| --- | --- |
| Ink type | Pure black |
| Print Density | 100% |
| Printing Mode | High Definition |
| Number of passes | 1 |

As shown in FIG. 11B, blind-holes 1104 are partially covered by the single layer of black ink. However, blind-holes 1104 still show some shiny appearance due to insufficient coverage of the terminal surfaces of the blind-holes 1104.

Example 4

Masked Printing Process Using Two Black Ink Layers

Figure 12B:
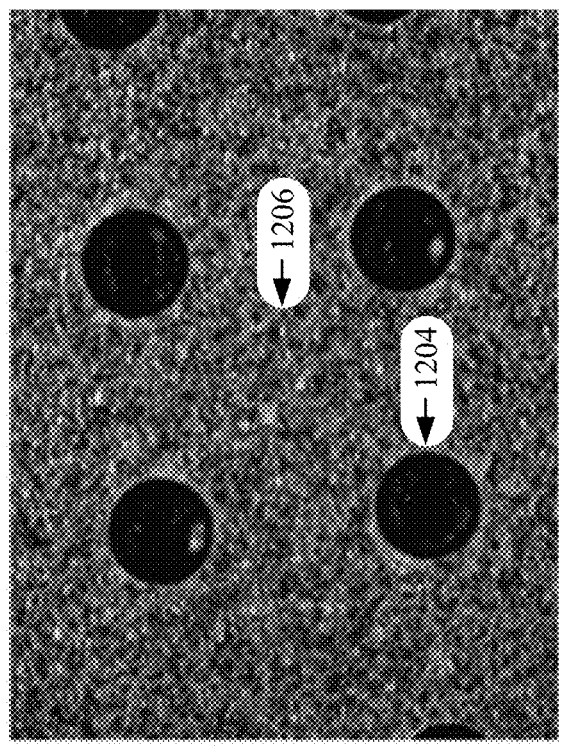
FIGS. 12A and 12B show images of substrate samples with through-holes and blind-holes that were deposited with two layers of black ink.
Figure 12A:
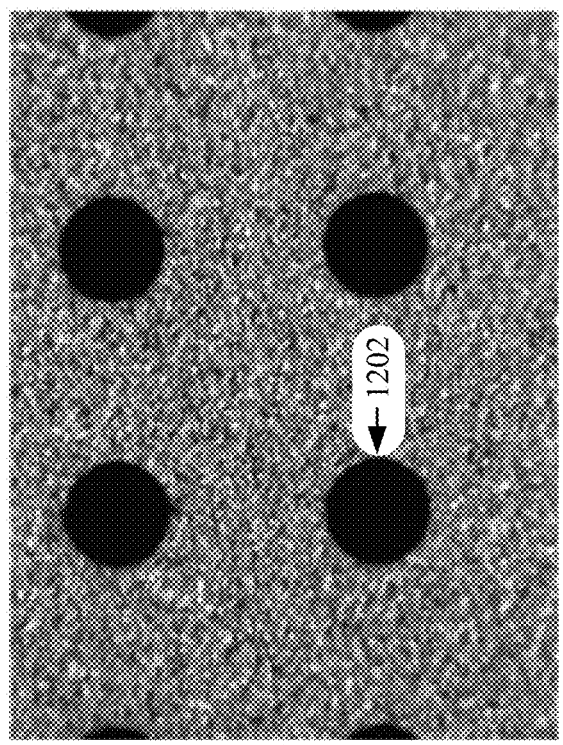

FIGS. 12A and 12B show Dino-LITE digital microscope images of through-holes 1202 and blind-holes 1204 that were deposited with two layers of black ink. After masking, the substrate was flood printed with black ink using the Canon Arizona 480GT UV/LED printer using the printing parameters provided in Table 2 below.

TABLE 2

| Parameter | Value |
| --- | --- |
| Ink type | Pure black |
| Print Density | 100% |
| Printing Mode | High Definition |
| Number of passes | 2 |

Compared to the single ink layer of black ink shown in FIG. 11B, the coverage of the blind-holes 1204 in FIG. 12B was significantly reduced with the two layers of black ink. In particular, only small white spots are observed in some of blind-holes 1204.

Example 5

Masked Printing Process Using One CMYK Black Ink Layer

Figure 13B:
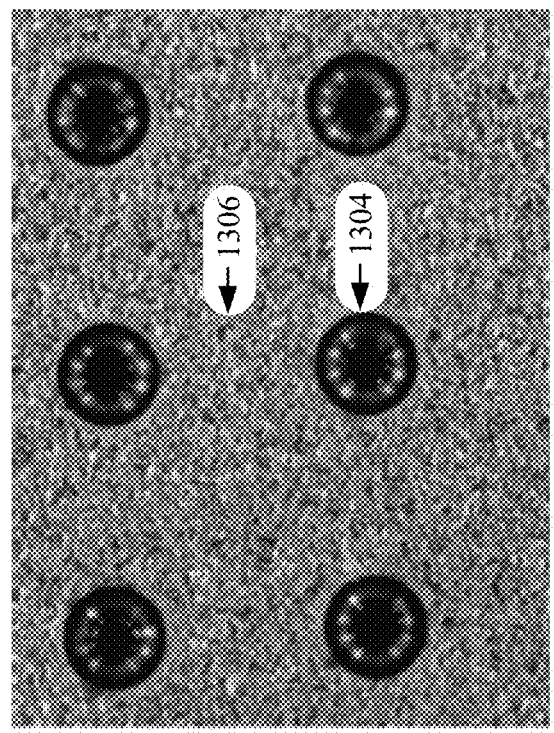
FIGS. 13A and 13B show images of substrate samples with through-holes and blind-holes that were deposited with one layer of a CMYK ink mixture.
Figure 13A:
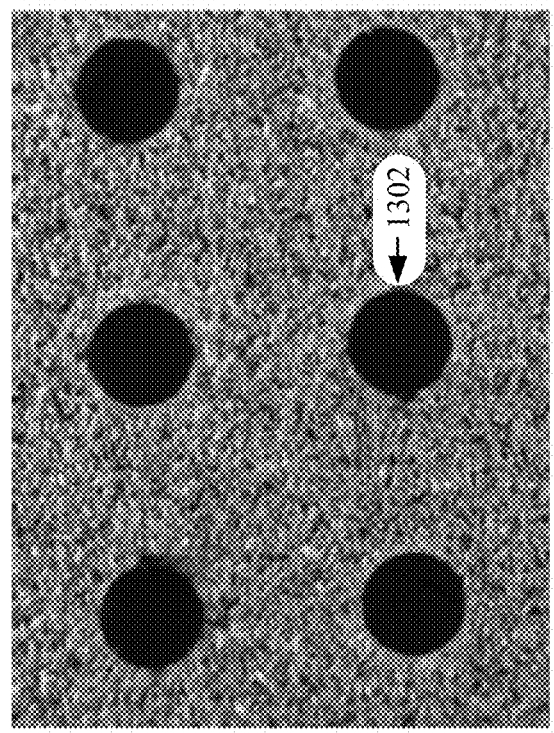

As described above, the black ink can be created from a CMYK mixture, which is different than a pure black ink. FIGS. 13A and 13B show images of through-holes 1302 and blind-holes 1304 that were deposited with one layer of CMYK mixture. The images were taken using a Dino-LITE digital microscope. After masking, the CMYK mixture was flood printed on the substrate in one pass using a Canon Arizona 480GT UV/LED printer using the printing parameters provided in Table 3 below.

TABLE 3

| Parameter | Value |
| --- | --- |
| Ink type | CMYK |
| Print Density | 100% |
| Printing Mode | High Definition |
| Number of passes | 1 |

Compared to blind-holes 1104 with the single ink layer of black ink shown in FIG. 11B, blind-holes 1304 in FIG. 13B appear to show more of the underlying reflective substrate and appears lighter in color. Thus, in some cases the pure black ink may provide more effective darkening of blind-holes compared to CMYK in mixtures.

Example 6

Masked Process Using Multilayered Pure Black Ink and Clear Ink Layer

Figure 14B:
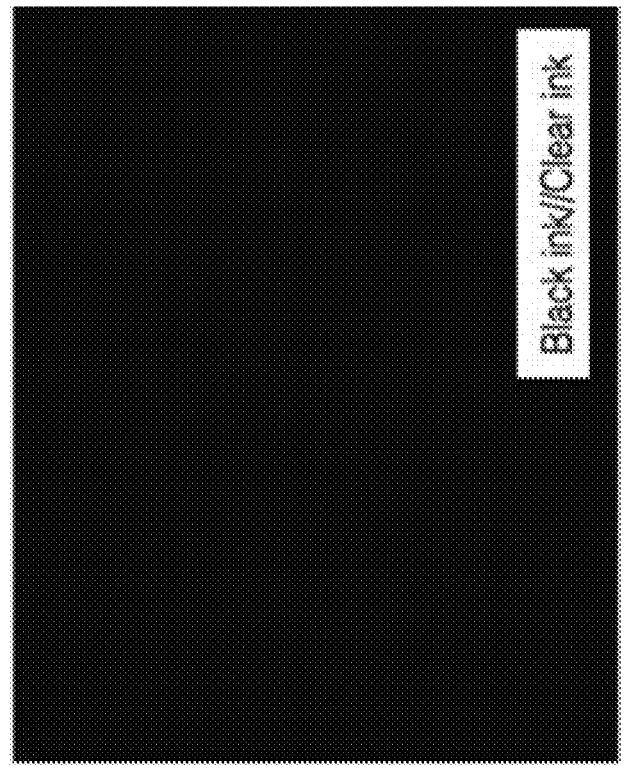
FIGS. 14A and 14B show images of a substrate covered with a layer of pure black ink and a substrate covered with multiple layers of black ink followed by a clear ink layer, respectively.
Figure 14A:
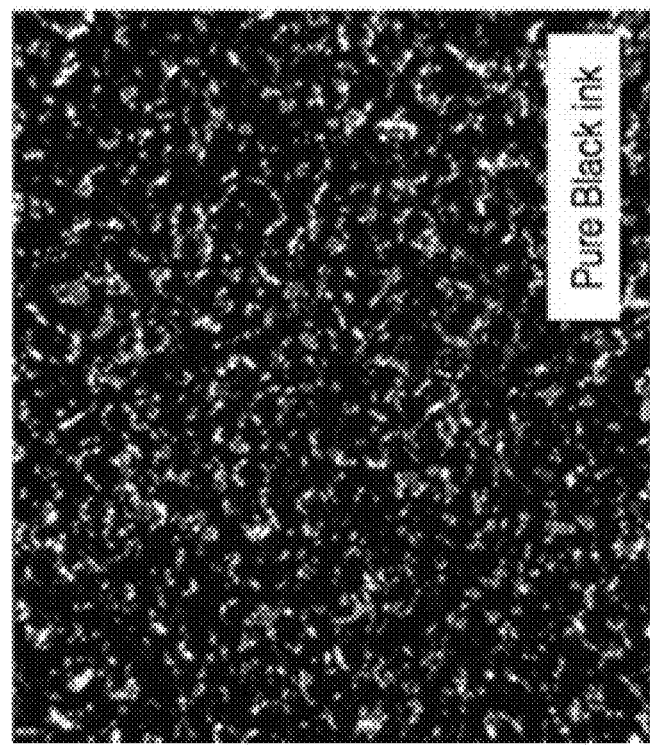

Multiple layers of black ink can be deposited followed by a clear ink layer in order to further reduce light reflection from within blind-holes. FIG. 14A shows an image of a substrate covered with a layer of pure black ink and FIG. 14B shows an image of a substrate covered with multiple layers of black ink followed by a clear ink layer. The images were taken using a Dino-LITE digital microscope. The black ink/clear ink deposition shown in FIG. 14B was deposited using Canon Arizona 480GT UV/LED printer using the multiple layered process provided in Table 4 below.

TABLE 4

| Layer 1 | Mixture of black ink 256 and clear ink; High definition mode |
| --- | --- |
| Layer 2 | Black ink 256; High definition mode |
| Layer 3 | Clear ink; Quality mode |

Comparison of FIGS. 14A and 14B shows that the mixture of black ink and clear ink in FIG. 14B results in a denser black color. The mixture of the black ink with clear ink (layer 1) allows for dispensing about two times more ink volume in the same pass. The pure black layer (layer 2) ensures sufficient density of the black ink to reduce light reflection. The clear ink layer (layer 3) reduces light reflection by eliminating point reflection from the black ink layer. In addition, the clear ink layer (layer 3) can protect the black ink against ink loss upon cleaning with chemical agents.

Figure 15:
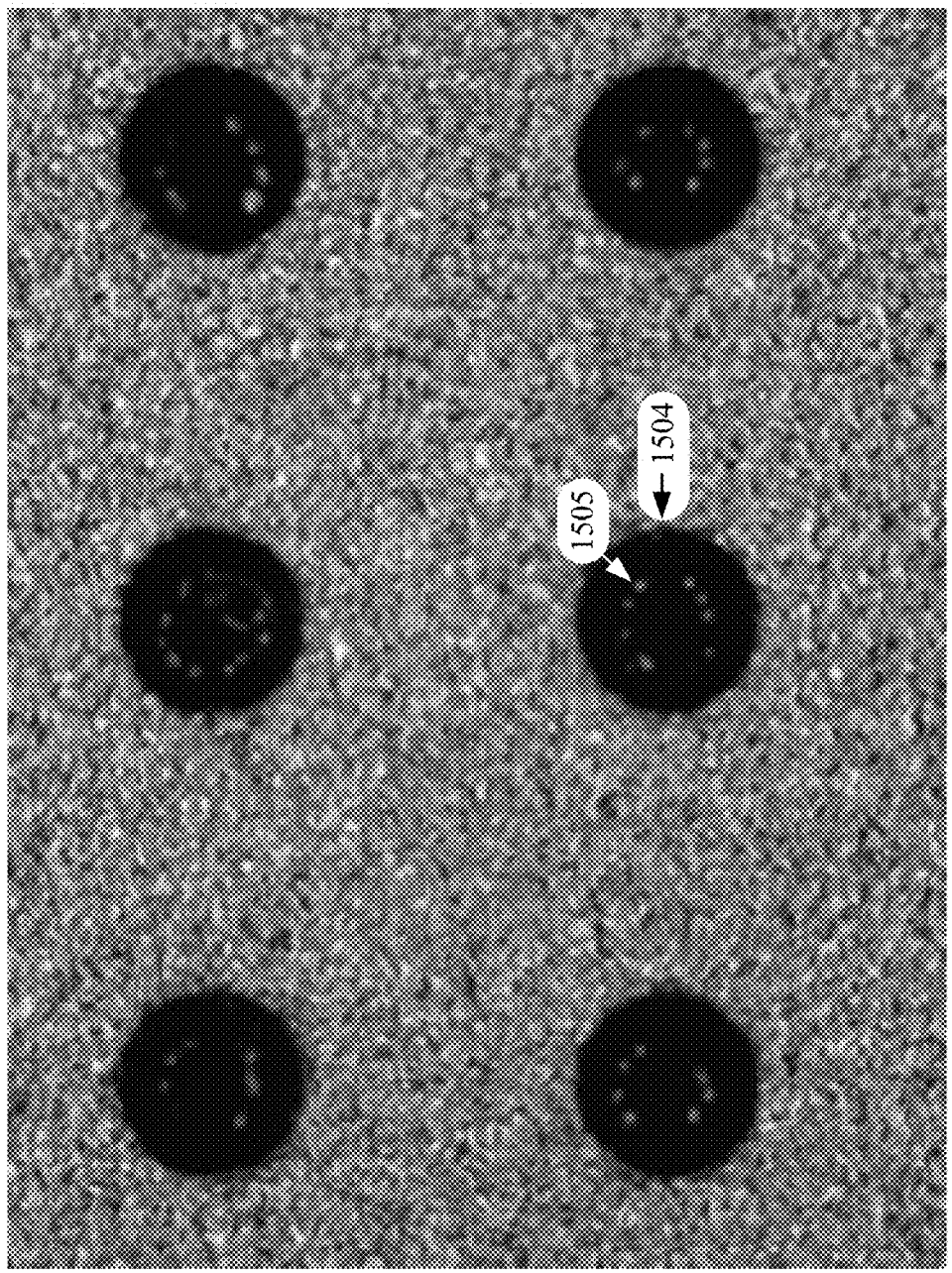
FIG. 15 shows an image of a substrate sample with blind-holes drilled with a 130 degree drill bit and deposited with multiple layers of black ink followed by a clear ink layer.

FIG. 15 shows a Dino-LITE digital microscope image of a substrate with blind-holes 1504 deposited with the multiple layered process of Table 4. As shown, blind-holes 1504 are substantially black with only tiny white spots 1505 associated with light reflection from the LED bulbs of the Dino-LITE microscope.

Figure 16:
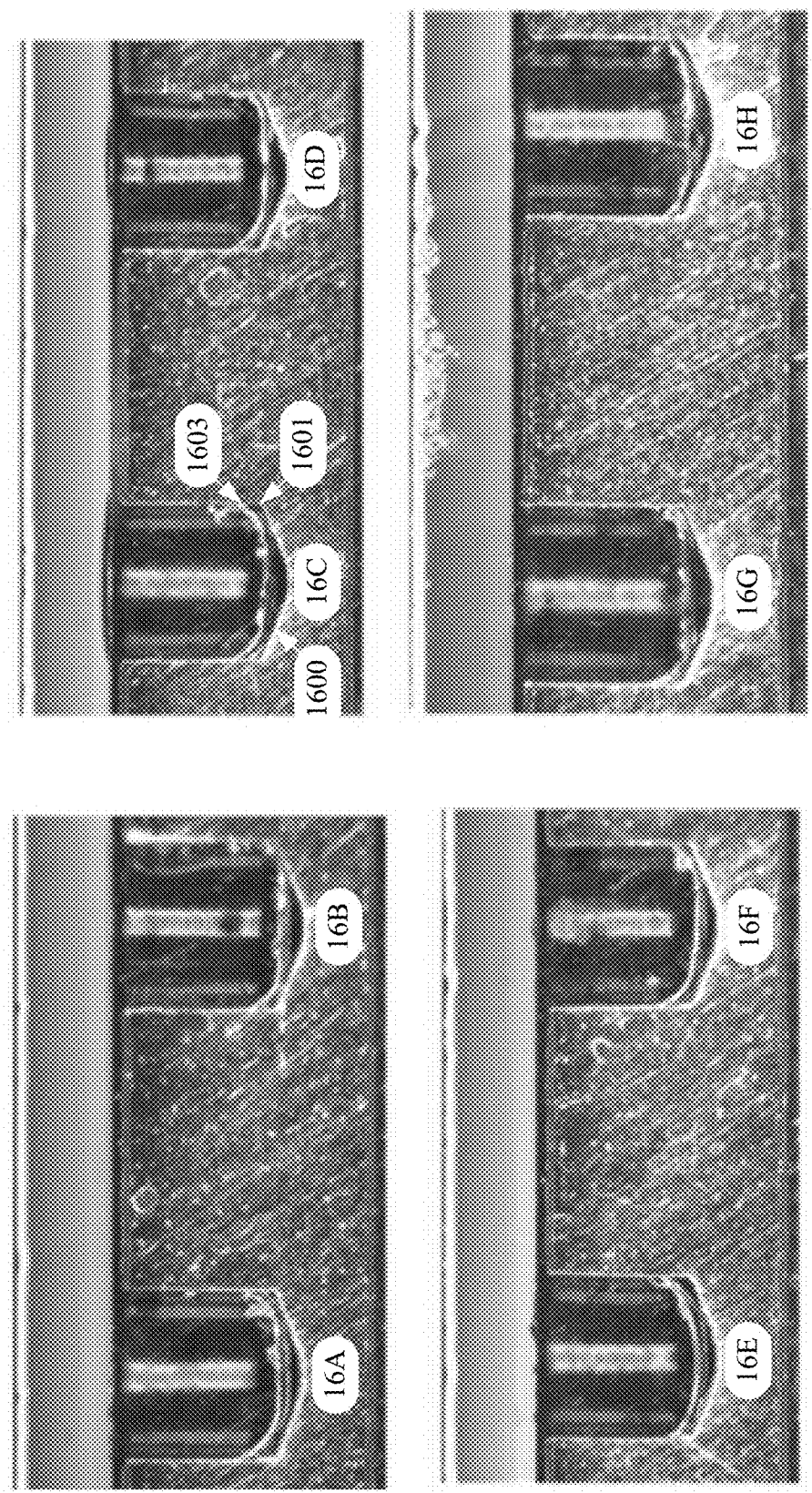
FIG. 16 shows cross section views of substrate samples with blind-holes drilled with a 130 degree drill bit and deposited with multiple layers of black ink followed by a clear ink layer.

FIG. 16 shows cross section views of substrate samples having blind-holes 16A-16H deposited with the multiple layered process of Table 4. Blind-holes 16A-16H were each drilled with a 130 degree drill bit resulting in cone shaped terminal surfaces 1600. As shown, the terminal surfaces 1600 of blind-holes 16A-16H are fully covered by the multiple ink layers. For example, coating 1601 and protective coating 1603 fully cover terminal surface 1600.

Example 7

Masked Process Using 150 Degree Drill Bit

The coverage of the terminal surfaces of the blind-holes can depend on the geometry of the terminal surfaces. FIG.

Figure 17:
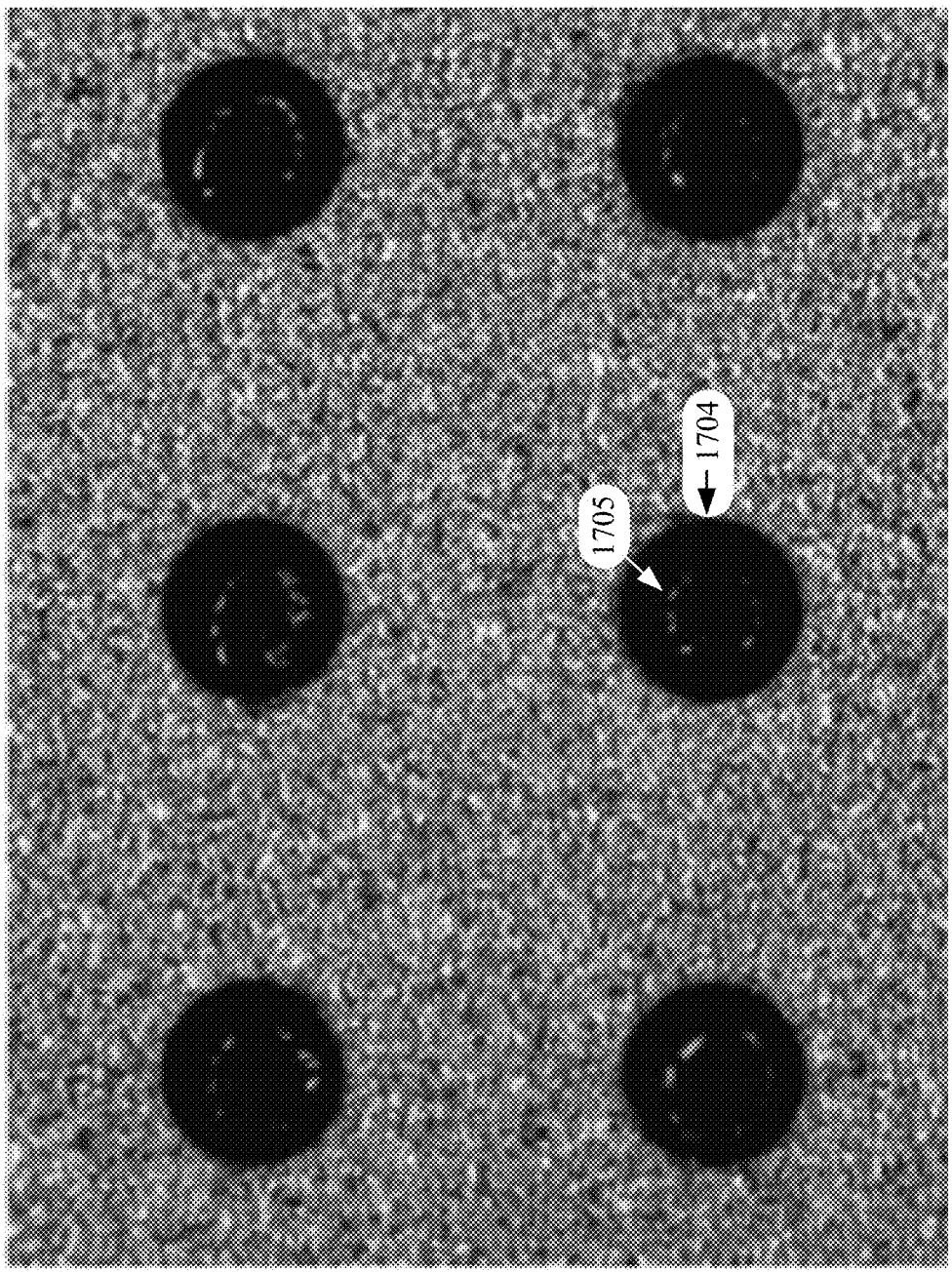
FIG. 17 shows an image of a substrate sample with blind-holes drilled with a 150 degree drill bit and deposited with multiple layers of black ink followed by a clear ink layer.

17 shows a Dino-LITE digital microscope image of a substrate with blind-holes 1704 that were drilled using a 150 degree drill bit and printed using Canon Arizona 480GT UV/LED printer using the multiple layered printing process provided in Table 4. A 150 degree drill bit has a shallower point angle compared to a 130 degree drill bit, resulting in a blind-hole having flatter terminal surface compared to a blind-hole formed using a 130 degree drill bit. FIG. 17 shows that the only lightness within blind-holes 1704 is in the form of tiny white spots 1705 associated with light reflection from the LED bulbs of the Dino-LITE microscope.

Figure 18:
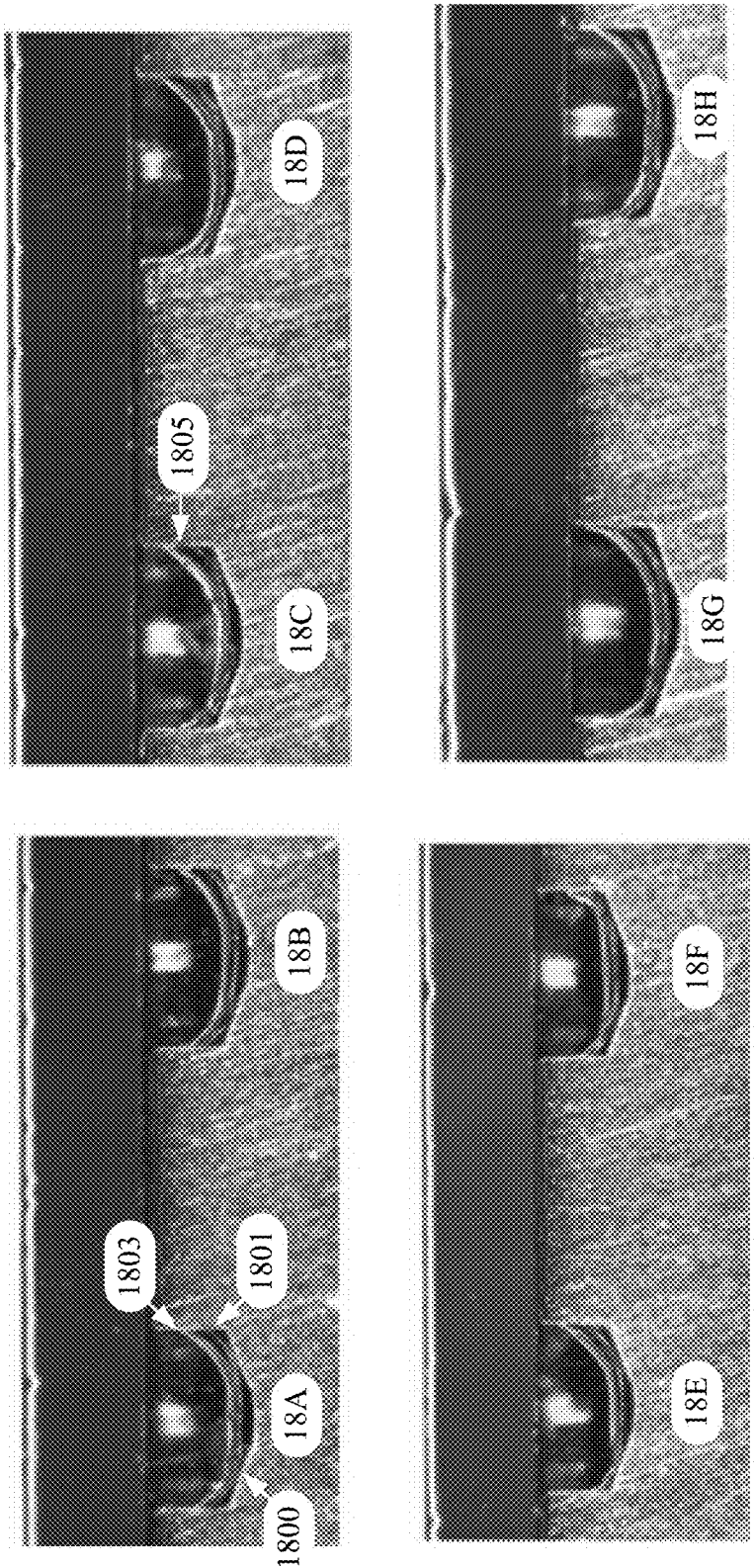
FIG. 18 shows cross section views of substrate samples with blind-holes drilled with a 150 degree drill bit and deposited with multiple layers of black ink followed by a clear ink layer.

FIG. 18 shows cross section views of substrate samples having blind-holes 18A-18H each drilled with a 150 degree drill bit and printed with the multiple layered process of Table 4. The terminal surfaces 1800 of blind-holes 18A-18H are shallower or flatter than the terminal surfaces 1600 of blind-holes 16A-16H formed using a 130 degree drill bit. As shown, the terminal surfaces of blind-holes 18A-18H are fully covered by the multiple ink layers. For example, coating 1801 and protective coating 1803 fully cover terminal surface 1800. In addition, the shallower geometry of terminal surfaces 1800 allow for more coverage of sidewall surfaces 1805 of blind-holes 18A-18H compared to blind-holes 16A-16H. In some cases, this can result in darker appearing blind-holes 18A-18H compared to blind-holes 16A-16H.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A housing for an electronic device, the housing comprising:
   a wall defining an internal cavity and having a perforated region at an exterior surface of the wall, the perforated region comprising:
      a through-hole having a through-hole opening at the exterior surface, the through-hole connecting the through-hole opening to the internal cavity, and a blind-hole having a blind-hole opening at the exterior surface, the blind-hole formed partially through the wall and terminating at a terminal surface opposite the blind-hole opening, the terminal surface having a coating that absorbs light passing through the blind-hole opening and incident upon the coating.

2. The housing of claim 1, wherein light incident upon the through-hole opening passes through the through-hole and into the internal cavity such that substantially no light reflects back through the through-hole resulting in the through-hole opening having a darkened appearance with respect to the exterior surface, wherein substantially no light incident upon the coating reflects back through the blind-hole such that the blind-hole opening is perceived as having the darkened appearance of the through-hole opening.

3. The housing of claim 1, wherein the housing is comprised of a metal material having a metallic color, wherein the blind-hole opening is perceived as having a darker color than the metallic color.

4. The housing of claim 1, wherein the through-hole provides access to a speaker housed within the internal cavity, the through-hole allowing sound from the speaker to pass therethrough.

5. The housing of claim 1, wherein the coating comprises black ink.

6. The housing of claim 1, wherein the coating comprises multiple ink layers, wherein one of the multiple ink layers is a protective layer deposited on at least one layer of black ink.

7. The housing of claim 6, wherein the protective layer prevents loss of the black ink from the blind-hole.

8. The housing of claim 1, wherein the through-hole opening has the same diameter as the blind-hole opening.

9. The housing of claim 8, wherein the diameter is about 0.5 mm or less.

10. The housing of claim 1, wherein the perforated region includes a number of blind-holes and a number of through-holes, the blind-holes and through-holes arranged approximately equidistantly with respect to each other.

11. The housing of claim 1, wherein the electronic device is a portable computing device, tablet computer, desktop computer or mobile phone.

12. A method of forming a perforated structure, the method comprising:
   forming through-holes within a substrate having a first surface and an opposing second surface, the through-holes formed through the first surface and the second surface;
   forming blind-holes within the substrate, the blind-holes formed through the first surface and not through the second surface such that the blind-holes have terminal surfaces; and
   camouflaging the blind-holes to appear as through-holes by darkening the terminal surfaces of the blind-holes.

13. The method of claim 12, wherein camouflaging the blind-holes includes depositing an ink coating on the terminal surfaces.

14. The method of claim 13, wherein depositing the ink coating includes depositing multiple layers of ink.

15. The method of claim 13, further comprising:
   depositing a protective layer on the ink coating, the protective layer preventing loss of the ink coating from the blind-holes.

16. The method of claim 13, wherein depositing the ink coating comprises:
   selectively depositing the ink coating within the blind-holes without substantially depositing the ink coating on the first surface.

17. The method of claim 13, wherein depositing the ink coating comprises:
   depositing the ink within the blind-holes and on the first surface; and
   after the depositing, cleaning the first surface.

18. The method of claim 12, wherein darkening the terminal surfaces of the blind-holes comprises:
   masking the first surface of the substrate, and
   depositing an ink coating on at least the terminal surfaces of the blind-holes.

19. A perforated structure, comprising:
   a substrate having a first surface and opposing second surface, the substrate comprising:
      a number of through-holes formed through the first surface and the second surface, and a number of partial holes formed through the first surface and not through the second surface such that inner walls define the partial holes,
wherein the inner walls have an ink coating that imparts a dark appearance to the partial holes.

20. The perforated structure of claim 19, wherein the partial holes further include a protective layer formed on the ink coating that prevents loss of the ink coating from the partial holes.

* * * * *